United States Patent
Jungerman et al.

(10) Patent No.: US 12,321,457 B2
(45) Date of Patent: Jun. 3, 2025

(54) TRUSTED SOFTWARE CONTAINER MANAGEMENT SYSTEM

(71) Applicant: Operant Networks, Santa Rosa, CA (US)

(72) Inventors: Roger L. Jungerman, Petaluma, CA (US); Randall King, Santa Rosa, CA (US); Andrew B. Bartels, Redmond, WA (US)

(73) Assignee: Operants Networks, Santa Rosa, CA (US)

( * ) Notice: Subject to any disclaimer, the term of this patent is extended or adjusted under 35 U.S.C. 154(b) by 123 days.

(21) Appl. No.: 18/365,963

(22) Filed: Aug. 4, 2023

(65) Prior Publication Data
US 2024/0143765 A1    May 2, 2024

Related U.S. Application Data

(60) Provisional application No. 63/420,988, filed on Oct. 31, 2022.

(51) Int. Cl.
G06F 21/57    (2013.01)
G06F 21/53    (2013.01)
(Continued)

(52) U.S. Cl.
CPC ............ G06F 21/57 (2013.01); H04L 9/0819 (2013.01)

(58) Field of Classification Search
CPC ....... G06F 21/57; G06F 21/53; H04L 9/0819; H04L 9/0833; H04L 9/3242;
(Continued)

(56) References Cited

U.S. PATENT DOCUMENTS

| | | | |
|---|---|---|---|
| 8,151,349 B1 * | 4/2012 | Yee | G06F 21/53 713/165 |
| 11,575,512 B2 | 2/2023 | King et al. | |

(Continued)

OTHER PUBLICATIONS

U.S. Appl. No. 63/059,876, "Comprehensive Configurable Network Security for Distributed Energy Resource Infrastructure", filed Jul. 31, 2020.

Primary Examiner — Darren B Schwartz
(74) Attorney, Agent, or Firm — Perkins Coie LLP

(57) ABSTRACT

A trusted container management system provides process supervision, such as for software or other executable processes. In an embodiment, a particular edge controller can include a Rich Execution Environment (REE) and a Trusted Execution Environment (TEE). In an example, an application executes in a container of the REE and generates communication data and a signature identifier. A DeftT publication is generated and includes the communication data. An untrusted validator in the REE evaluates the DeftT publication according to a trust rule associated with the communication data and publishes the DeftT publication. A secure validator executing in a Trusted Execution Environment (TEE) further evaluates the DeftT publication. The further evaluation can include subscribing to the certificate identified by the signature identifier, determining the public key and the role of the certificate, and validating the DeftT publication based on the public key. The further evaluation can further include subscribing to a particular trust rule.

20 Claims, 8 Drawing Sheets

(51) Int. Cl.
*H04L 9/00* (2022.01)
*H04L 9/08* (2006.01)
*H04L 9/32* (2006.01)
*H04L 9/40* (2022.01)

(58) Field of Classification Search
CPC ....... H04L 9/3247; H04L 9/3263; H04L 9/50;
H04L 63/0435; H04L 63/0442; H04L
63/065; H04L 63/123; H04L 63/126;
H04L 63/20
See application file for complete search history.

(56) References Cited

U.S. PATENT DOCUMENTS

| | | | | |
|---|---|---|---|---|
| 2014/0289748 | A1* | 9/2014 | Collado | G06F 21/53 |
| | | | | 719/320 |
| 2017/0286668 | A1* | 10/2017 | Shanahan | G06F 21/53 |
| 2019/0005229 | A1* | 1/2019 | Hlaing | G06F 9/445 |
| 2022/0414212 | A1* | 12/2022 | Hopkins | G06F 21/75 |

* cited by examiner

TRUSTED SOFTWARE CONTAINER MANAGEMENT SYSTEM

TECHNICAL FIELD

The present disclosure relates to systems, methods, and computer-readable media having computer-executable instructions provided thereto for process supervision and container management in a trusted environment. More specifically, the present disclosure relates to trusted container management systems (TCMS), such as systems for trusted software container management.

BACKGROUND

There is a transformation of the energy delivery infrastructure, progressing at a rapid pace, that risks exposing the electric grid to increased cybersecurity and resiliency risks. This grid evolution is being driven by certain decentralization trends. The first commonly appreciated trend is that of power generation shifting from large, centralized facilities to millions of highly distributed intelligent assets called Distributed Energy Resources (DER). A second less understood, but equally important, trend is that software is being decentralized to hardware devices, with advanced capabilities like artificial intelligence/machine learning (AI/ML) and computation moving out to the network edge. Finally, the third trend is the decentralization of ownership of energy facilities, equipment, sensors, and other infrastructure, together with future transactive energy trading. For instance, a wind farm with storage could have five or more stakeholders who each need access or information from the field, but for very different reasons. The convergence of these trends creates a cybersecurity perfect storm with a greatly increased attack surface that places energy infrastructures at risk.

Figure 1:
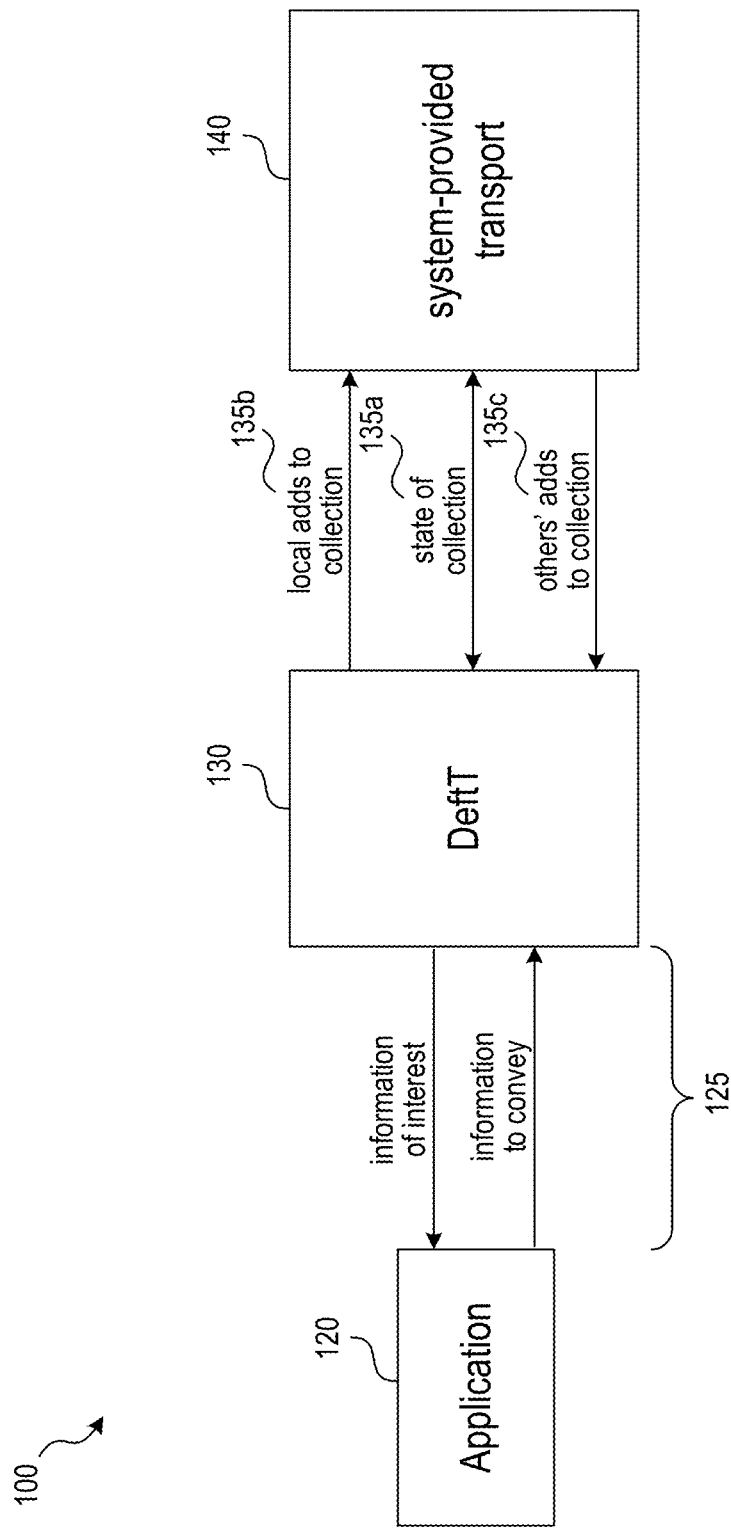
FIG. 1 shows an example data flow in a in a trusted container management system (TCMS), according to some embodiments.

The drawings have not necessarily been drawn to scale. Some components and/or operations may be separated into different blocks or combined into a single block for the purposes of discussion of some of the embodiments of the disclosed system. Moreover, while the technology is amenable to various modifications and alternative forms, specific embodiments have been shown by way of example in the drawings and are described in detail below. The intention, however, is not to limit the technology to the particular embodiments described. On the contrary, the technology is intended to cover all modifications, equivalents and alternatives falling within the scope of the technology as defined by the appended claims.

DETAILED DESCRIPTION

Conventional operational technology (OT) deployment methods are manual, with minimal capabilities. For example, software is loaded onto off-the-shelf devices, like communications edge controllers, and best effort approaches are taken to secure the software and hardware devices (e.g., edge controllers). These best effort approaches include password protection and encrypted access links to devices, such by using TLS or Virtual Private Networks (VPN). However, these approaches are difficult to enforce reliably due to password compromises such as phishing attacks, the use of default passwords, or missing or out-of-date certificates. This problem only gets worse with many smaller sites. Furthermore, maintaining a dedicated IT staff to manage and enforce best-practices for an entire DER fleet or other industrial infrastructure assets is prohibitively expensive.

To avoid these issues, larger utilities have historically used brute force security approaches, such as dedicated private fiberoptic connections to each site. In addition, boundary security typically uses firewalls with restrictive access rules, in an attempt to isolate these large systems. However, as sites get smaller, and ownership more dispersed, this approach is uneconomical, and it still cannot securely grant access to the many independent stakeholders who require it.

As a further shortcoming present in existing solutions, asset inventory lists of software versions on equipment, and the most up-to-date secure versions, are not kept or enforced. Software upgrades are often performed over an open internet connection to a vendor portal. This leaves a cyber vulnerability point in the DER equipment. While the software upgrade may be cryptographically signed to provide authentication, not all DER vendors follow the same upgrade protocols. Also, if the equipment has already been compromised there is no guarantee that the authentication validation will be performed properly. An increasingly common form of cyber-attacks results from supply chain exploits. These attacks are increasingly performed by very sophisticated actors, and this is likely to increase as the decentralization trends make prime targets of various infrastructures.

Boundary protection with firewalls alone is now known to suffer from various shortcomings, such as a lack of granular access control, so that each individual is limited to performing only those activities that for which their role is authorized, in order to minimize risks. Moreover, mere boundary protection techniques do not guarantee that the response of the system to any requests is in the form that was requested, in addition to verifying the authority to perform that request.

In a multi-vendor environment, several vendors may have software running concurrently on the same hardware. This software can be deployed and upgraded with containers such as with Docker. However, the use of software containers raises the risk of cyber compromise in a standard processor due to several factors. For example, in a traditional processor, multiple applications are run concurrently in the same environment. There have been numerous cybersecurity exploits enabled using compromised inter-process communications. As another example, full-featured operating systems (OS) such as Linux are increasingly complex, with an extensive attack surface, and routinely have security vulnerabilities that must be patched, while patching hygiene is often not carefully followed. As yet another example, a compromised process in one container can set up communications channels to exploit by remote attackers. Also, internal busses including those to secure hardware, such as key storage in a Trusted Process Module (TPM), are subject to compromise. As yet another example, within a processor with a partitioned architecture for security (e.g., AMD processors with a Platform Security Processor (PSP), ARM processors with TrustZone, and Intel processors with Trusted Execution Technology and/or SGX Software Guard Extensions), only the Trusted Execution Environment (TEE) can access the TPM. However, the OS and hardware support in the TEE is limited so that all applications cannot run there. Others do not have TPM support, putting any stored keys at risk. Once keys are compromised, all security and access controls can no longer be trusted. As yet another example, a Docker container only simplifies the deployment of process code, it does nothing to guarantee that the code is defect-free. There have been many cases where compromised code is deployed as a container. This is a form of a supply chain attack.

The systems, methods, and computer-readable media described herein provide a technical advantage of securely and economically deploying and maintaining multi-vendor software application containers. In some embodiments, example systems, methods and computer-readable media operate using a relatively more secure partitioned architecture, such as one or more processors with TEE support. As described herein, an example system may anticipate attack and compromise of the container environment, despite conventional best-practices in application access controls, boundary security, and secure communications. Various embodiments described herein can provide continuous supervision and container management in a trusted environment to facilitate the rapid isolation and replacement of infected processes.

To address the various shortcomings discussed above, as well as other limitations with existing solutions known to those skilled in the art, described herein is a novel system that can employ a Trusted Execution Environment (TEE) to securely manage software containers (the "system"), such as in an energy delivery infrastructure environment or other infrastructure environments, as well as associated methods and computer-readable media. In some embodiments, the system includes access control, which provides the ability for an industrial infrastructure system administrator (e.g., an electric utility, a water utility, a gas utility, or other entity providing utility services; or an industrial process provider, including chemical, oil refining, pipeline, railroad switching coordination and management systems, transportation signaling such as traffic control lights and traffic management, or manufacturing; or environmental control provider including building management systems, HVAC, agricultural and irrigation systems) to define the security rights for specific devices. The system can further include container applications within those devices, that can be accessed by multiple parties.

Embodiments described herein relate to a Trusted Container Management System (TCMS), which can be used to measure and control industrial infrastructure systems, including energy generation and storage systems, industrial SCADA control systems, and/or building management systems and thermostats. In some embodiments, the TCMS includes a deployment console through which an industrial infrastructure provider or other entity with administrative privileges can manage the TCMS. As described herein, the deployment console provides the ability for the infrastructure provider or other administrator to define the security rights, through one or more trust rules that collectively form a trust schema, of entities attempting to communicate with other entities (e.g., between users and/or containers). The deployment console can additionally enable the industrial infrastructure provider to grant access to multiple entities without broadly exposing the industrial infrastructure provider's network to those multiple entities or other third parties.

In some embodiments of the system, network communications between devices and/or within devices of the system are routed by employing Information Centric Networking (ICN). Furthermore, in some embodiments a robust brokerless publish/subscribe (pub/sub) network with trust rule-based access control capabilities can employ Defined-Trust Transport (DeftT), utilizing the underlying principles of Named Data Networking (NDN). Some embodiments employ a TEE. Some embodiments include a container management system or similar virtual execution environment.

As described herein there are numerous variations of ICN that can be used in embodiments of the TCMS, such as NDN and/or DeftT. ICN key distribution, DeftT trust rules, DeftT pub/sub, software container deployment, and Trusted Execution Environments, have been described in the academic and commercial literature. However, the overall diversity of ICN research is much broader, and the use of these specific ICN and DeftT features for business-level application in industrial infrastructure networks is not currently known. As described herein, a TCMS (e.g., used for industrial infrastructure) properly configures and distributes keys and trust rules, as well as defines the interfaces between Trusted and Rich Execution Environments (respectively, TEE and REE) of a processor and the network, the deployment of software containers, and the management of those containers. The TCMS can be implemented in one or more software applications/libraries, hardware components, and or a combination of software and hardware.

Ordinarily, properly configuring conventional systems and interfaces/communication channels, including operating system selection, partitioning of functionality in the TEE and REE, monitoring of traffic flow, and control of application execution in a pub/sub architecture is challenging to perform correctly to ensure adequate resiliency, throughput, and security. The systems and methods described herein enable one to define DeftT shims and relays which can securely and efficiently transition network traffic between the TEE and REE. Application containers may be installed, maintained, controlled, and updated securely and efficiently using the pub/sub architecture.

As described herein, an advantage of DeftT is its ability to make cryptographic keys securely and resiliently available. By utilizing DeftT, the TCMS can generate these DeftT keys with application-meaningful hierarchical names (like all named data) and thus they can be managed in a straightforward manner. There is currently no convenient way for users to invent and organize the critical namespaces that enable DeftT. The TCMS and deployment console, however, provides a unifying mechanism for the user to initially construct, review, and then extend the namespaces.

Another aspect of the TCMS is that keys are authorized and distributed as DeftT data publications, with a trust chain starting with a root key certificate which is established by an outside secure mechanism. Each authorized key can have unique trust rules which govern the access allowed (which may be more restrictive than the root key access) as controlled by the deployment console. The trust rules can also specify if a subordinate authorized user is allowed to issue keys further down in the key hierarchy, which should be performed correctly to ensure adequate security. Another aspect of the TCMS is that software binaries deployed in the containers are also signed at compilation time for security. The same root key can be used for the signing of the software binaries and the software certificates as is used for the DeftT root key. Alternatively, a different software signing root key can be used for software binary signing, provided that software certificates corresponding to the full software binary trust chain, including the software binary root of trust, are published to or otherwise provided to entities (in some embodiments, all entities) validating the authenticity of the software binary.

In some embodiments of the TCMS, the deployment console can use DeftT to enable consistent and simplified communication among entities (e.g., users and/or resources) operating in any of several types of industrial infrastructure environments, including several types of communication architectures, and different virtual and physical assets. For example, and as described further herein, the deployment console can secure communication over existing and developing standards for control of industrial infrastructure assets (e.g., DNP3, Modbus, IEEE 2030.5, IEEE 1815.2, IEC 61850, LoRaWAN, BACnet), over more general protocols such as XML and TCP/IP, and over various Internet media such as wired Ethernet, fiber optics, cellular, satellite links, microwave, and other general purpose wireless media.

Another aspect of the system, including the TCMS, is the use and customization of DeftT relays and collection selection. This maintains the isolation between the TEE and REE.

Another aspect of the system, including the TCMS, is the ability to add sequential nonces and a hash between pairs of DeftT publications into each new publication to create an immutable ledger of the DeftT publications. The resulting ledger can be used as a forensic audit log where publications cannot be subsequently added, deleted, or modified in the system.

Another aspect of DeftT pub/sub is the resiliency provided by publishing data packets through broadcast transmissions. For example, container updates can be efficiently published to multiple entities to maintain consistent and cyber-secure software version control. As a further example, industrial infrastructure systems can broadcast measurement data to multiple interested users. It will be appreciated that DeftT data publications are ephemeral and will expire after the expected time to traverse the TCMS. It will be further appreciated that by expiring ephemeral data, packets no longer add to the local DeftT publication capacity limits in a DeftT collection as set by a binary Invertible Bloom Filter Lookup Table (IBLT). It is appreciated that the selection of the publication lifetimes can optimize the throughput of the TCMS.

While the TCMS is described primarily in the context of using DeftT, it will be appreciated that the system can utilize other communication architectures. More generally, the TCMS can utilize any suitable form of ICN, such as NDN, Content Centric Networking (CCN), Mobility First, eXtensible Internet Architecture (XIA), and others.

In some embodiments of the system, the deployment console can utilize the Versatile Security (VerSec) trust language. VerSec provides a simple, general framework for constructing self-consistent, validatable ICN (information centric) names. The VerSec schema description language describes constraints on both the layout and components of names and on the structural and digital signing relationships between names. It is a referentially transparent, declarative language like Prolog or Datalog, based on unification and resolution programming language and compiler constructs. Versec statements simply state security and access control relationships as declarative facts that can be given in any order and then analyzed for logical consistency and provability. For example, only when the compiler has all the facts does the compiler analyze them to determine if they are consistent, complete, and verifiable. As a further example, only when the compiler can prove consistency, completeness and verifiability, does the compiler generate a logically consistent and provable compiled trust schema as a binary output.

In network software deployments for industrial infrastructure and energy applications, the existing communications infrastructure has limitations that are addressed with the proposed solution and systems. First, conventional deployments typically utilize processors that have a single execution environment with known security vulnerabilities due to inadequate isolation between software containers, insecure supervisory controls, minimal access controls, and inconsistent software upgrade processes. Secondly, industrial infrastructure networks typically use insecure communications protocols. Third, typical networks employ a point-point architecture that limits efficient software distribution, industrial equipment measurement distribution, and distributed control by multiple parties with defined access authorizations that are possible with a pub/sub design. Finally, there is a business need to implement a conceptually simple and economical solution that can be applied to a variety of hardware form factors at varying price points. Simultaneously meeting these network requirements is quite complex when considering cost, resiliency, throughput, and security requirements. The system described herein, including the use of DeftT, provides a secure light-weight system architecture that can be supported on low-cost edge controller hardware, while addressing the existing communication infrastructure limitations described above.

Various implementations of the system will now be described. The following description provides specific details for a thorough understanding and an enabling description of these implementations. One skilled in the art will understand, however, that the system can be practiced without many of these details and/or with alternative approaches. Additionally, some well-known structures or functions may not be shown or described in detail so as to avoid unnecessarily obscuring the relevant description of the various implementations. The terminology used in the description presented below is intended to be interpreted in its broadest reasonable manner, even though it is being used in conjunction with a detailed description of certain specific implementations of the system.

The potential risks associated with conventional industrial infrastructure systems, the shortcomings of existing solutions, and the advantages provided by embodiments of the disclosed system (e.g., the TCMS), is described more fully herein.

Operation of an Embodiment of the Trusted Container Management System Using DeftT ICN is a modern networking architecture in which identified data or content is used for access, rather than an address as is used in legacy TCP/IP. NDN is an example of ICN. ICN has not been widely deployed commercially and is largely unknown in applications with infrastructure assets. NDN is an open-source architecture and offers a broader user community.

Some uses of ICN for access control in infrastructure systems using pub/sub has been described in U.S. Patent Application Nos. 63/059,876 ("Comprehensive Configurable Network Security for Distributed Energy Resource Infrastructure") and Ser. No. 17/390,726 ("CONFIGURABLE NETWORK SECURITY FOR NETWORKED ENERGY RESOURCES, AND ASSOCIATED SYSTEMS AND METHODS"), both of which are incorporated by reference in their entireties.

FIG. 1 shows an example data flow 100, according to some embodiments, using the DettT protocol. DeftT 130 is a lightweight transport protocol (implemented by, for example, networking hardware and/or software) optimized for Operational Technology (OT) industrial networks and using the underlying principles of NDN. DeftT 130 uses named data such as NDN and a pub/sub architecture, where named collections of publications are created. As shown, applications 120 can use DeftT 130 to submit and receive queries 125 to add to and/or access from a distributed collection of publications. DeftT 130 operates to add (135b, 135c) to collections (e.g., via the cAdd operation, which can be characterized as a collection add request message) using the system provided transport 140. The DeftT 130 component can also receive and provide responses to collection state (cState) queries 135a using the system provided transport 140.

In an example implementation, a cState query 135a is broadcast by a device to all recipients indicating which publications that device has in their collection. A cState message can be characterized as a collection state request message. This cState publication inventory is encoded as a binary Invertible Bloom Filter Lookup Table (IBLT). All other recipients with publications in their collection that are not in the IBLT then transmit any missing publications that they may have. For efficiency, all broadcast recipients add any publications from any cAdd to their local collection (135b), independent of whether they originated the cState request. This publication subscription synchronization process ensures that publications are distributed as widely and efficiently as possible to all users holding the collection. However, other approaches can be used to synchronize publications in the collection.

In an embodiment, and transparently to applications 120, a DeftT 130 instance both constructs and validates all publications using a formal, validated process. New DeftT 130 instances are configured with certificates, along with a signing chain that includes its private signing identity and has the same root of trust as the certificate of trust rules. For security, DeftT 130 validates credentials as a chain of trust and against the shared trust rules and does not accept publications without a fully validated signer identity.

In an embodiment, DeftT 130 transport is optimized for broadcast networks including IPv6 UDP multicast as well as broadcast wireless radio media.

As described above, in some embodiments the system utilizes DeftT as a networking protocol (e.g., for software container management). In some embodiments, the system implements numerous customizations to the DeftT protocol that enable various improvements.

A first aspect of customization is the use of faces. A DeftT face is the interface to a particular physical or logical transport media. Examples of faces include: IPv6 UDP multicast over ethernet, a TCP wired or cellular unicast face, interfaces within a processor between a TEE and REE environment, and/or secure hardware such as a Trusted Process Module (TPM). Since many industrial OT systems employ TCP IP links and not UDP multicast, in some embodiments of the system, the system's implementation of DeftT can designate multiple TCP faces into a single TCP-multicast group face. This facilitates the efficient distribution of publications in a TCP-only environment. The selection of faces can be application specific.

A second customization of DeftT is through shims. Shims are application-specific code, which converts between application meaningful messages (e.g., communication data generated and/or received by applications, which can include various data fields or properties, such as application identifiers) and the DeftT publications. In some embodiments, certain aspects of a TCMS (e.g., unique application logic) can be implemented in these customized shims. One aspect of a shim can be a relay. A DeftT relay "passes through" valid publications from one DeftT synchronization domain to another and can also contain custom application specific functionality.

Another customization is the use of a parser to examine traffic content for security and access control purposes. The parser evaluates the network packets prior to DeftT encryption, signing and publication. This process parses OT protocol information to, for example, either generate the DeftT publication header and/or to validate that the network packet content is consistent with an existing DeftT publication header. The DeftT publication header together with a corresponding DeftT trust rule determines whether the specific user (with corresponding role certificate) has access rights to publish those specific OT protocol commands.

Symmetrically, after transmission of the DeftT publication, the subscriber (such as an edge controller at a utility generation site) decrypts the publication and determines if the role of the signer of the publication had access rights to have published it, as defined by the trust rule. The subscriber can also parse the protocol publication contents again to reverify the access rights per the trust rule. While this dual checking of access rights may appear redundant, it provides a secondary verification of the publication and guards against spoofing of fraudulent publications. This further improves the security of the overall system.

Peer entity authentication in DeftT comes through the integrated trust management engine. In an example embodiment, a DeftT instance can be started with an identity bundle that includes the public root of trust, a certificate of the trust schema signed by the trust root, and its own signing identity chain with a private signing key and the chain signed at top by trust root. This is published before any publications are sent. The trust management engine can in certain embodiments and/or unconditionally drop any publication that does not have a valid signer or whose signer lacks the role or capabilities required for that specific publication.

A compromised member of a trust domain can only build messages that match the role and capabilities in its signing chain. Thus, for example, a compromised auditor can query the state of allowed systems but cannot issue modified trust rules.

However, if the processors that are publishing the publication and subscribing, decrypting and operating upon the commands in the publication are compromised, they may not apply the security rules as intended. By making use of the enhanced on-chip security of a TEE, the integrity of the DeftT security is enhanced.

In DeftT, shims are used to incorporate application-specific software that interfaces with the DeftT transport including pub/sub, validation, and trust rules. Shim customizations can be extensive and include much of the application-specific content. Relay shims are a type of DeftT shim that include application-specific customized software into a relay bridging the internal interface between two independent DeftT collections.

Embodiments of the system described herein can include custom DeftT shims, each of which can include application-specific software that provides one or more of the aspects of the system described herein, and which can overcome various shortcomings of conventional systems. The DeftT shims in the system can include, in some embodiments, TCMS shims and relay shims, which include but are not limited to those described below.

Within the REE of the TCMS, DeftT customized shims can be included in REE application containers and/or the REE untrusted supervisor component, providing for a secure DeftT transport interface to the TEE. The functionality of the shims can include the packaging of relevant information into appropriate DeftT publications and publishing these, subscribing to other publications, and interfacing with the untrusted supervisor.

In the TEE of the TCMS, corresponding DeftT interface shims can ensure that network traffic across the TEE and the REE domain boundary is signed and encrypted, and is compliant with the DeftT publication validation processes and trust rules, thereby eliminating traffic across the boundary lacking these security controls. Moreover, TEE interface shims can communicate with the secure supervisor component in the TEE to audit traffic and flags over the REE-to-TEE boundary. The shims can also configure DeftT to reject any traffic from other processes that do not meet the DeftT validation criteria and track corresponding flags through the secure supervisor.

In some embodiments, the custom shims in both the TEE and the REE can use a custom parser to validate the publication OT protocol packet contents against the DeftT publication header (e.g., as part of a consistency check) and to additionally validate the DeftT publication header against the trust rules. Accordingly, the shims can facilitate extending a particular DeftT trust rule validation to the OT protocol packet contents themselves (e.g., by evaluating the payload of a DeftT publication), beyond (and/or in addition to) validating the DeftT publication name in the DeftT header.

In some embodiments, in the TEE and/or REE (e.g., a container in the REE), a custom configurable parser shim may support multiple OT protocols.

Additionally, customized relays and shims within the TEE can provide a method for the gating of publications from the REE to an external communications interface to an external destination system, by blocking the transmission of publication information between the REE collection and the external interface collection, which can be controlled by the secure supervisor or other processes within the TEE such as when a corrupted container is identified. In some embodiments, such a custom relay shim can also pass valid audited publications through the gate and can optionally sign the audited publication with a trusted private key within the TEE TPM for enhanced authentication. The custom DeftT shim can add sequential nonces and a hash between pairs of DeftT publications into each new publication from the TEE to form a secure TEE ledger. This forensic ledger record of all the publications cannot be later added to, deleted from or modified even from within the TEE, if it were to be subsequently compromised. This ledger can be published to other entities in the network including to a server that has extended storage capability and is able to archive the full set of TEE ledgers from all entities in the network.

In some embodiments, a custom DeftT shim within the container manager within the TEE can interface with a container platform such as Docker or the Open Container Initiative to securely deploy software containers into the REE using DeftT publications. Furthermore, the container manager custom shim can subscribe to publications of a version control list as well as to alert publications from the secure supervisor component to determine when to publish new container updates to the REE and to which container they should be deployed.

In some embodiments, custom DeftT shims in the supervisor in the REE and the secure supervisor in the TEE can securely exchange process auditing information and flags using DeftT transport with encryption and validation. It will be appreciated that publication sharing between the untrusted supervisor and the secure supervisor can enable a comprehensive determination within the secure supervisor (e.g., using Artificial Intelligence (AI), Machine Learning (ML) or other techniques) of when the external interface communication through the relay gate should be blocked, and when updated containers should be published by the system from the TEE to the REE.

In some embodiments, custom shims in the administrator component or other entities accessible over the external communications interface (external entities) can also interface with processes and containers in the TEE through appropriate DeftT publications. It will be appreciated that administrator shim processes can provide high-level control of the TCMS through the version control list and other publications. It is further understood that the external entities accessed through custom shims to DeftT publications can also deploy containers to the REE and additionally securely exchange publications with processes or containers in the TEE and with corresponding shims within the REE through the custom relay shim in the TEE. As described herein, the system's customizations of DeftT makes it possible to use the TEE to securely deploy containers within the REE, securely detect if they are compromised, disable them if infected, and redeploy an updated authenticated container, using secure DeftT processes.

Trust Schemas

Embodiments of the systems, methods and computer-readable media of the present disclosure support access control through trust schemas. A trust schema specifies which roles, behaviors, or actions are allowed and consists of several specific trust rules. The rules constrain how information such as sensor data is communicated.

Figure 2:
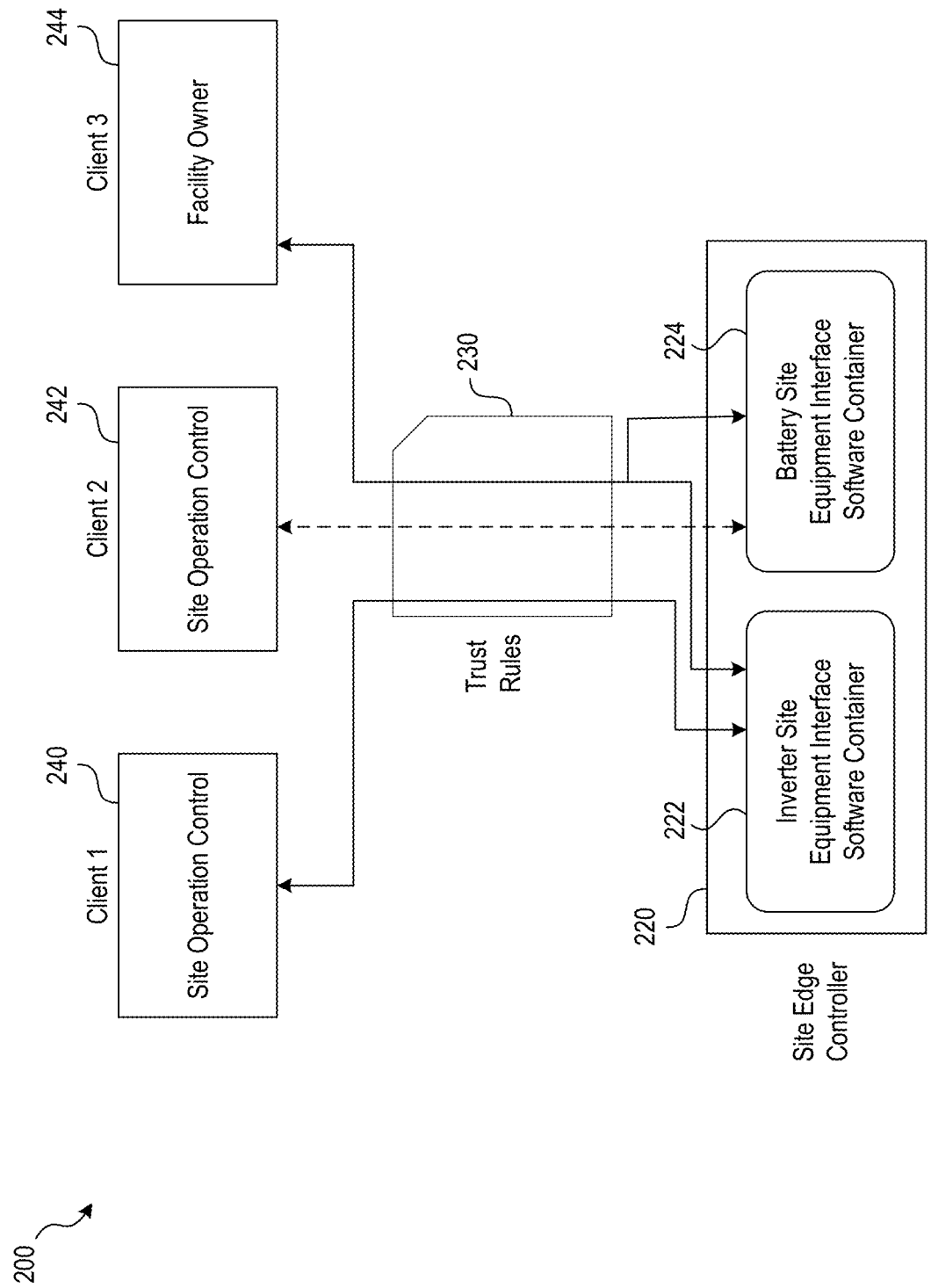
FIG. 2 shows an example architecture for trust rule control in a TCMS, according to some embodiments.

FIG. 2 shows an example architecture 200 for trust rule control in a TCMS, according to some embodiments. For example, separate application containers (222, 224) within an infrastructure communications edge controller 220 can be configured by trust schema rules 230 to only allow access from specified client applications (240, 242, 244). For example, a renewable energy infrastructure site edge controller might have two software containers: one software container with control software for a solar panel inverter, and a second software container with control software for a battery energy storage system. Further, different client systems (not shown) can be granted access to different containers. For example, a network client for a site operations controller can be granted access to the inverter container only, while a separate client for the battery subsystem vendor can access the software container of the storage system. As a further example, a third client for the facility owner is granted access to both software containers. These permissions can be managed on both the client and the system controllers, as authorized by the secure trust schema which is distributed to all entities. Changing the designated permissions requires modifying the signed trust schema, and this requires an authority with a high-level certificate and private key.

The trust schema, including trust schema rules 230, as well as DeftT publications can be encrypted and authenticated using strong EdDSA asymmetric signatures, although one of skill will appreciate that other encryption/signing algorithms can be used. Private keys can be securely stored in a TPM in the edge controllers or servers, in more secure Hardware Security Module (HSM) for the highest-value keys, or in other security chips or devices, and are also controlled through proper business processes. Public key certificates can be efficiently and securely distributed using the DeftT pub/sub transport.

In some embodiments, application-specific hierarchical naming of role certificates, publications, and collections of publications provides business-appropriate meaning. For instance, DeftT's unit of information transfer is a publication. Validation of all publications including user data, certificates, and trust schemas can be performed through a chain of public key certificates to a root of trust (Root), also called a trust anchor, that can be stored locally at one or more of an edge controller and server. Self-signing or signing by a separate certificate authority can be used to authenticate the root of trust certificate. In some embodiments, all publications are signed, and the signature validated upon receipt.

Publications can be used both for ephemeral communication, like commands and status reports which have a specified lifetime as part of the application, and longer-lived information like certificates. In some embodiments, the set reconciliation sync protocol identifies publications using a hash of the entire publication, including its signature. A sync collection can contain at most one instance of any publication, and replays of publications in the collection can be discarded as duplicates on arrival.

In some embodiments, all DeftT cAdd additions can be authenticated. They may be signed or AEAD encrypted with a securely distributed unique nonce group key. This selection can be specified in the trust schema.

In some embodiments, cAdd publication additions can be encrypted. When encrypted, the symmetric group key can be automatically and securely distributed using signing identities. Each receiver can use its copy of the current symmetric key to validate the AEAD MAC and decrypt the added content. AEAD has a technical advantage in that is also provides authentication in a compact efficient algorithm that is well adapted to computationally lightweight hardware, such as may be present in an edge controller of an infrastructure environment.

In some embodiments, peer entity authentication in DeftT is performed through the integrated trust management engine. A DeftT instance can be started with an identity bundle that includes the public root of trust, a certificate of the trust schema signed by the trust root, and its own signing identity chain with a private signing key and the chain signed at top by trust root. These items are published before any publications are sent. The trust management engine can unconditionally drop any publication that does not have a valid signer or whose signer lacks the role or capabilities required for that specific publication.

It will be appreciated that a compromised member of a trust domain can only build messages that match the role and capabilities in its signing chain. Thus, for example, a compromised auditor can query the state of allowed systems but cannot issue modified trust rules.

Example System Architecture

Figure 3:
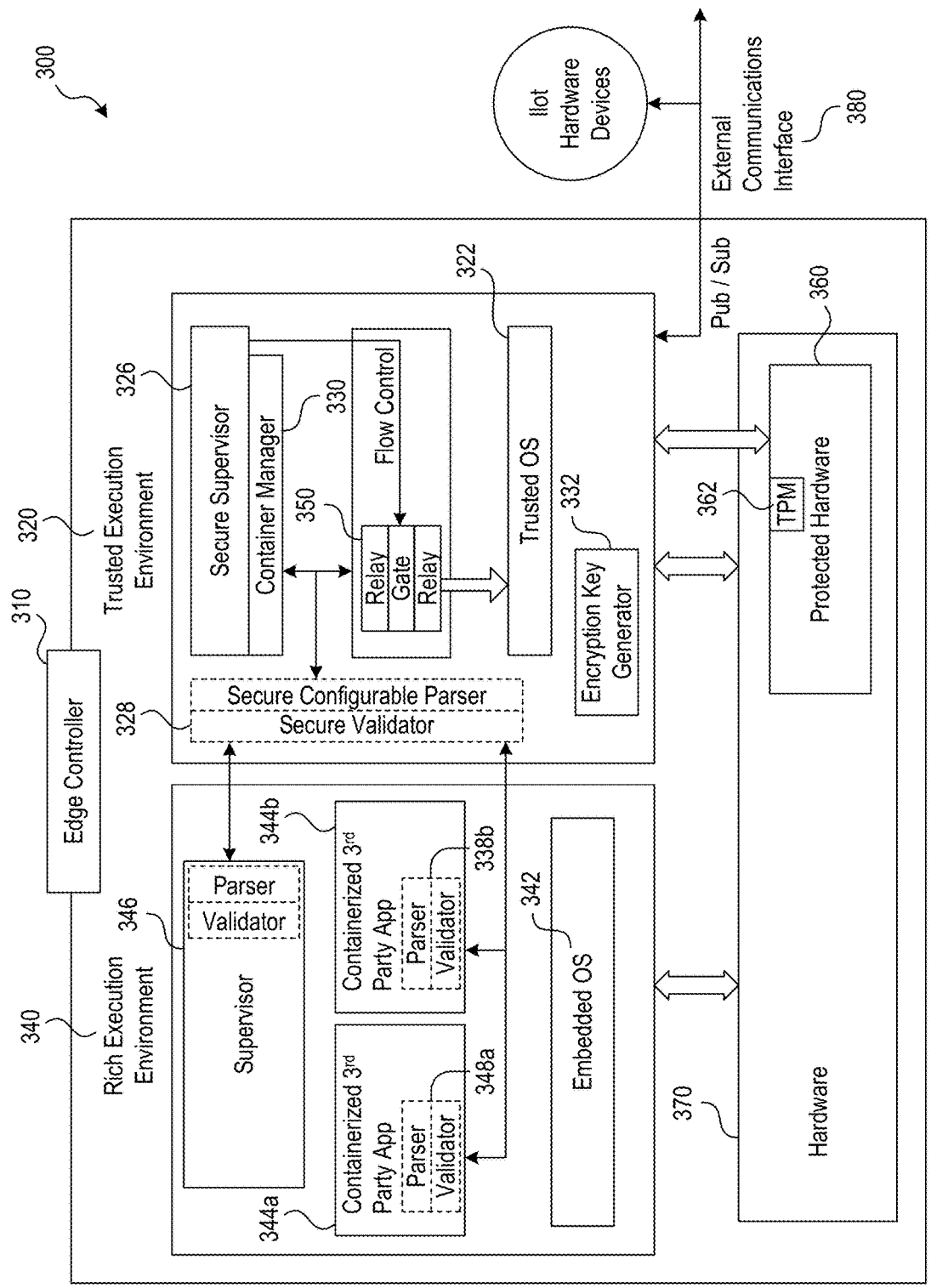
FIG. 3 shows an example TCMS architecture, according to some embodiments.

FIG. 3 shows an example TCMS architecture 300, according to some embodiments. FIG. 3 includes an edge controller 310, but it will be appreciated that the overall architecture can be utilized in additional or other system entities, such as system clients and servers. The edge controller 310 and/or other system entities includes a processor, which can be partitioned into two environments with hardware isolation between them. These two environments are the Trusted Execution Environment (TEE) 320 and the Rich Execution Environment (REE) 340.

In the example architecture of FIG. 3, specialized processes that run in the TEE 320 are intended to be defect-free—for example, by limiting the number and scope of trusted processes and thereby reducing the attack surface. A trusted operating system (OS) 322 is used in the TEE 320, which also has much reduced attack surface and functionality compared to the full-featured embedded OS 342 in the REE 340. The trusted OS 322 can be responsible for, for example, controlling the pared-down secure processes within the TEE 320. The TEE 320 can use secure cryptography in conjunction with TPM key storage for secure key management. For example, a TEE 320 on a mobile platform such as a phone makes it extremely difficult to extract the phone keys and passwords. Hence, the TEE 320 can be an advantageous location to host the DeftT pub/sub communication link, including the key management.

FIG. 3 illustrates various components that can, in some embodiments, comprise a TCMS at least in part. As described herein, the TCMS can be implemented on a general purpose processor that provides an REE 340 and a TEE 320, and it can comprise components that operate within the REE 340 and/or TEE 320. The components can be implemented with software, hardware (e.g., circuitry found in a general purpose processor, an ASIC, FPGA), and/or any combination of software and hardware. A brief summary of the components that, in some embodiments, comprise a TCMS is provided below, with further explanation provided in the examples that follow.

The TCMS can include one or more software containers (344*a*, 344*b*), operating in the REE 340, that contain software applications. Each container can include a DeftT shim, a parser, and/or a validator (shown as a parser/validator 348*a*, 348*b*). The DeftT shim can enable the container to communicate using DeftT and/or NDN (e.g., it can generate publications based on data generated by the contained application). The DeftT shim can contain a publication 'builder' to create valid publications and a 'validator' to check them. The validator can be used to validate the publication (e.g., are the keys associated with the publication valid, is there a chain of trust back to a root trust, and is the publication performing an allowed action). The parser can evaluate the publication to verify that the publication's contents are consistent with the publication's header. The validator and/or a separate trust rule validator (not shown) can verify that the trust rules are authentic and that the publication header is allowed by the trust rule for the role of the signer of the publication obtained from the name of the signing certificate.

The TCMS can include a supervisor 346 operating in the REE (e.g., an untrusted supervisor 346). The supervisor 346 is a high-level process that audits the performance of other processes in the environment and uses analysis, Machine Learning (ML) and Artificial Intelligence (AI) to determine if any of the supervised processes are compromised. The supervisor 346 can, for example, evaluate the results of the parser and validator to determine whether publications are allowed to be published to the TEE 320 or are blocked and why they are blocked. Using this parser/validating auditing information, together with other process checks such as application flags, the supervisor 346 can determine if the processes in the REE 340 containers (344a, 344b) are executing as expected or if they are corrupted. If the supervisor 346 determines that processes in the REE 340 containers (344a, 344b) are corrupted, it can determine whether the containers should be blocked and/or replaced. It will be appreciated that since the supervisor 346 executes in the REE 340, there is a possibility that the supervisor 346 can also be corrupted (e.g., due to a cyber-attack). Therefore, the supervisor 346 can coordinate with the secure supervisor 326 in the trusted TEE 320 environment to determine if remedial action is required. In some embodiments of the system, the supervisor 346 executing in the REE 340 may have access to additional process auditing information, such as flags, that are unavailable to the secure supervisor 326 executing in the TEE 320. Therefore it can be advantageous, in some embodiments, for the system to utilize information from both the secure supervisor 326 and the untrusted supervisor 346, as doing so can improve the likelihood of identifying corrupt containers and/or a corrupted untrusted supervisor container that require replacement.

The TCMS can include a secure parser and/or secure validator 328 operating in the TEE. The secure parser/secure validator 328 can perform similar checks to those performed by the parser/validator (348a, 348b) in the REE 340, but provide greater security because they operate in the TEE 320. Further, the secure parser/validator 328 can evaluate the publications from multiple different containers in the REE 340 and/or different publication types.

The TCMS can include a supervisor 326 operating in the TEE (e.g., a secure supervisor 326 (i.e. a trusted supervisor component)). The secure supervisor 326 can subscribe to publications from the REE 340 supervisor 346 as well as evaluate checks performed by the secure parser/secure validator (328). The secure supervisor 326 can determine, for example, whether a publication should be permitted to exit the system. As a further example, if any issues are identified by the TCMS with the publication, the secure supervisor 326 can take certain actions, such as preventing a publication from exiting the computing system, modifying trust rules, replacing containers in the REE 340, etc.

The TCMS can include one or more gates and relays 350 operating in the TEE. The gates and relays 350 can be used to publish an internally-generated publication (e.g., from a software container) to a communication channel external to the computing system. The gates and relays 350 can also prevent a publication from being published. The TEE 320 shim can sign publications which have successfully passed through the TEE 320 gate using the secure private key stored in the TPM 362 of the hardware component 370. It will be appreciated that the auditing and signing within the TEE 320 can ensure that publications with the auditing signature (e.g., signed by the secure private key in the TPM 362) have successfully passed through the security review as mediated by the secure supervisor 326 in the TEE 320. It is understood that this reduces the risk that publications bypass the TEE 320 when passing from the REE 340 containers (348a, 348b) to the external communications interface 380.

The TCMS can include a container manager 330 operating in the TEE 320. The container manager 330 can facilitate the deployment, re-deployment, upgrade, etc. of software containers in the REE 340. For example, the container manager 330 can generate a software container for execution in the REE 340, that includes an application (which can be in a container) and additional components (e.g., a DeftT shim, parser, and/or validator).

The protected hardware 360 and interface 380 (e.g., a TCP/IP interface) can be used to securely interface with other site equipment, numerous small ASIC-based IloT devices, and multiple additional edge controllers over a secure pub/sub mesh using DeftT.

In some embodiments, the publication validator/parsers in both the REE 340 and the TEE 320 subscribe to the asymmetric-key-encrypted AEAD symmetric encryption key as well as any required public key certificates needed to validate the signing of command and response publications. As illustrated in FIG. 3, the AEAD symmetric encryption key generator 332 can be implemented and/or execute in the TEE. It will be appreciated that implementing the AEAD symmetric encryption key generator 332 in the TEE can provide additional security during the key generation process prior to publication. In some embodiments, the symmetric key generator 332 can alternatively be disposed in the REE 340 or in a separate process accessed over the external communications interface. It is also understood that other symmetric encryption protocols such as AES or asymmetric encryption can be employed. In some embodiments, once the DeftT publication signature is validated it is decrypted, it is parsed and the signature role as well as the parsed packet content is evaluated against the VerSec trust rule (not shown) for permissions. The trust rule is also signed, so it is validated prior to use. The results of the validations can be passed to the secure supervisor 326 to control the gates and relays 350 and container manager 330.

The container manager 330 coordinates with the secure supervisor 326 in the TEE 320 and also subscribes to publications of the supervisor 346 in the REE 340. The container manager 330 may reload containers based on results of a threat analysis. Using a relay within the TEE 320, the secure supervisor 326 can block the publication to the external communications interface 380. As is described in more detail below, software containers can be deployed and redeployed securely into the REE 340. The container manager 330 orchestrates the deployment of containers in the REE 340.

Applications within the TEE 320 can also be deployed in containers by a container manager 330 in an administrator entity (not shown) with higher levels of security in a hierarchical fashion, as is described in more detail below.

Trusted Execution Environment in an Example Embodiment

Referring now in more detail to the TEE 320, the TEE 320 can generally be characterized as a secure hardware within a processor. It ensures that software operating inside is protected for confidentiality and integrity. Advantageously, data in the TEE 320 cannot be altered or viewed by unauthorized entities or processes. Software images can be signed and verified with keys stored securely in the processor hardware fabric so they are guaranteed to be authentic. Data within the TEE 320 can be encrypted, and data can only enter the encrypted region through predefined channels with strict checks. Example implementations of TEE 320 include ARM TrustZone and Intel SGX. The environment within the TEE 320 can have a Trusted Operating System (OS) 322 such as MBED or OPT-TEE for ARM TrustZone. The Trusted OS 322 can access the protected hardware 360 in the TEE 320, such as secure memory and the TPM 362 for key storage. Booting of the Trusted OS 322 can be tightly controlled with only properly signed versions being allowed to prevent the introduction of defects into the code after release.

In some embodiments, the features of the trusted OS 322 can be limited so that full featured applications reside in the REE 340 with additional hardware resources and a full featured OS such as Linux. According to some embodiments, one is enabled to tightly control the interfaces between the TEE 320 and the REE 340 and the outside external communications interface 380. The TEE 320 can be thought of like a semiconductor "clean room". The hardware capabilities in the TEE 320, in analogy to the clean room filters enable a very low particulate environment. However, if the clean room doors are opened and a dusty breeze blows in, the environment is contaminated. DeftT communications together with trust rules enforced by keys securely stored in a hardware TPM 362 can provide an appropriate level of control.

Containerized Software Deployment in an Example Embodiment

Referring now in more detail to REE 340 containers (344a, 344b) of FIG. 3, containerization is a software development approach that isolates processes that share an OS kernel and binds the application libraries into one deployable unit. Containers (344a, 344b) can be hierarchical where some of the binaries in the container are other containers. Compared to a Virtual Machine (VM) containers are lightweight, as some implementations require only the application configuration information and code from the host OS. Hence containers (344a, 344b) are ideally suited for lightweight edge controllers.

By using containers (344a, 344b), multiple vendors with unique application software requirements for varying equipment on a site can most easily deploy their capabilities in containers mediated by a shared container engine, single host OS (in the REE 340), and hardware infrastructure. On Linux systems, Docker, Linux Containers (LXC), and processes described by the Open Container Initiative and others can be used to deploy containers.

The example system described herein can perform the following container management operations:
1. Automatically restarting failed containers (344a, 344b);
2. Removing unresponsive containers (344a, 344b);
3. Managing version control and updates for containers (344a, 344b); and/or
4. Continuously assessing containers (344a, 344b) for abnormal or malicious activity.

The secure supervisor 326 in the TEE 320, which can enable general system security visibility and control, can be leveraged by working with the container manager 330. In some embodiments, for example, by securely interfacing with the supervisor 346 in the REE 340, additional insight can be gained about the system health. If any anomalies are detected, this can be considered a red flag, and any traffic to the external communications interface 380 can be blocked using the gates in relays 350 in the TEE 320. Then the corrupted container can be replaced by the container manager 330 by publishing the new version from the TEE 320 to the authorized container location in the REE 340. This updated container can be obtained via subscription from a container store on an administrator entity accessed over the external communications interface 380. The TEE 320 container manager 330 can also subscribe to a version control list from the external communications interface 380. This can facilitate proactively pushing updated container versions to the REE 340, as determined by the container manager 330. In addition to one or more application containers (344a, 344b) in the REE 340, other items including those in the TCMS in the REE 340, such as the supervisor 346, can be deployed and redeployed as containers by the container manager 330 as described herein. According to some embodiments, a significant advantage on DeftT pub/sub for software distribution is the use of multicast. Multiple container managers 330 can subscribe to software update publications and speed up and reduce the bandwidth bottlenecks associated with the roll-out of a new software version.

An additional security aspect of DeftT for container management is the incorporation of DeftT shims into the containers themselves. Then DeftT can distribute keys and apply trust rules with varying permissions to the separate containerized applications in the REE 340. This gives the TEE 320 container manager 330 additional tools to securely manage the remote containers in the REE 340.

Infrastructure Command Parsing

Referring now more generally to the secure parser/validator 328 in FIG. 3, in an industrial infrastructure application, an aspect of a strong cybersecurity design can be to control and assess the underlying process control commands to detect anomalies and to take action. OT protocols have a relatively more constrained set of commands, and repetitive predictable behavior which makes it easier to define permissions and supervise the applications. The MESA DER standards for DNP3 control of energy storage systems are one example of an industrial infrastructure system with detailed role-based permissions that require enforcement. This example standard, also part of IEEE 1815.2, uses zero trust to only allow specific commands for specified roles. Core to any command-level control is a parser, such as the parser/validator 328, which separates the individual commands. Industrial protocols such as Modbus and DNP3 each have their own parsers. It is found, that even for OT system protocols, significant cybersecurity vulnerabilities can be found in many parser implementations. Some parser designs use declarative language constructs rather than imperative programming.

However, even if best practices in parser design are followed, if the underlying parser process is running in an insecure REE 340, it can be hijacked for nefarious purposes. In the TCMS a secure parser/validator 328, advantageously works together with a validator at both sides of the interface between the TEE 320 and the REE 340 for each publication. In some embodiments, the role assigned to a specific container in the REE 340, together with trust rules and authentication certificates for it, defines clear permissions for each specific parsed command. By evaluating the permissions in both the REE 340 as well as the more secure TEE 320, proper enforcement is ensured. In some embodiments, only commands to (and responses from) the appropriate containerized applications in the REE 340 that are validated and with allowed permissions are passed through to the TEE 320.

While narrowly defined OT SCADA protocols such as Modbus or DNP3 can be parsed with detailed permissions at a command-level, other more general protocols can also be used to address important needs in industrial infrastructure systems. For example, IEEE 2030.5 is the Smart Energy Profile standard (SEP). SEP uses XML as an intermediate format and XML itself is a simple markup language that can be used for many applications. In these more general protocols, individual commands can be parsed for trust rule permissions. Still more generally, TCP/IP frames themselves can be parsed for IP addresses and optionally for some specific customized packet content information. In this way, complex firewall-like rules can be enforced for containers so that they can for example, only connect to specific IP addresses and to block specific content, e.g., HTTP transfers. While the DeftT packets are encrypted in transit, the AEAD keys are available at each parser/validator interface so that permissions from the trust rules can be applied by trusted agents. In contrast, other encrypted protocols like HTTPS are encrypted end-end and cannot be easily validated at intermediate nodes. The DeftT pub/sub architecture supports multicast which can be useful for TCP connection to multiple entities or containers, unlike typical TCP connections. Thus, for example, a TCP command could be sent to multiple remote sites with a single broadcast. Multiple users could subscribe to a single DeftT TCP data publication, optionally with different trust rule permissions for each user.

Some detailed examples are helpful to further illustrate specific processes and capabilities in the TCMS.

Example Container Deployment Architecture and Operations

Figure 4:
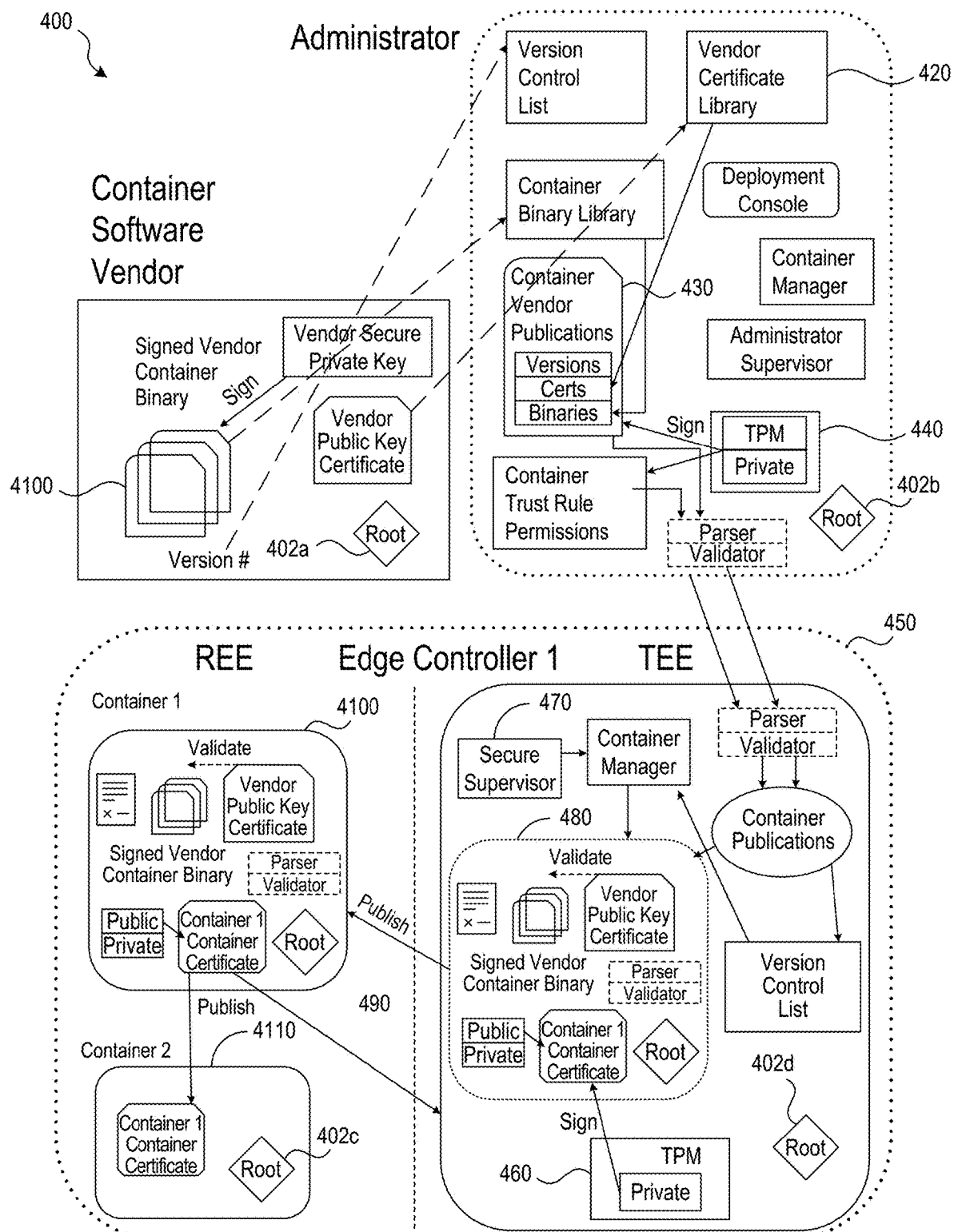
FIG. 4 shows an example infrastructure for container deployment in a TCMS, according to some embodiments.

FIG. 4 shows an example infrastructure 400 for container deployment in a TCMS, according to some embodiments. An example TCMS is shown, consisting of a single Edge Controller 1, two containers (Container 1 and Container 2) in the REE, and a separate Administrator entity on a server that interfaces with Edge Controller 1 over external TCP/IP. There exists a shared root of trust (402a, 402b, 402c, 402d) whose private key is maintained by a certificate authority (CA) that provides a public key certificate, that is shared by all entities. In some embodiments, a signing chain of trust, represented by certificates that are distributed as DeftT publications, can be used to validate each signed publication as well as the signed software binary back to the root of trust (402a, 402b, 402c, 402d), that is stored locally for validation.

The secure container deployment of the TCMS makes use of the defense in depth approach, where a layered security approach is employed. In an example embodiment, authentication to a shared root of trust (402a, 402b, 402c, 402d) is employed at each layer. Permissions are checked at multiple interfaces in multiple entities with detailed secure trust rules. Packet content is decrypted and checked at multiple points along the deployment path.

Defense in depth can be described in analogy with a medieval castle fortification. Out in the countryside there is no security. Crossing a bridge over a moat results in a higher security level and there are guards with checkpoints where a passport is checked and stamped. Inside is the gate to the courtyard with further checks. Finally, the highest level of security is in the castle tower at the center where the king resides with a guarded entrance. A courier wanting to deliver a message to the king needs be on an authorized visitor list that is checked, along with the passport photo when entering each security area (with a higher level of guard security clearance at each ascending level), as well as when exiting the prior level. These multiple checks give the highest level of assurance of identifying a poisoned letter being delivered to the king, despite some guards perhaps being spies.

In some embodiments of the TCMS, publications can be parsed and validated both on exiting the REE and upon subscription in the TEE. These initially received publications are termed "unaudited publications". The secure supervisor can audit the processes and validation success history both in the TEE as well as in the REE through subscription to untrusted supervisor publications. If the secure supervisor opens the gate in the TEE relay, any passed publications are termed "audited publications". These audited publications can be optionally signed with the secure private key in the TPM, that is only found in the TEE, as evidence that the audited publication has in fact passed through the TEE. Accordingly, the audited publication signed with the secure private key in the TPM can provide further indications that the publication has not bypassed the TCMS security protocols.

FIG. 4 is considered in detail by reference to the example operations below.

At step 410, a third party software vendor with a binary with a version number may want to deploy an update to the vendor's application that runs in Container 1 on Edge Controller 1 in the field at a remote energy site. The software binary is signed with the vendor private key by a containerization system such as Docker. In some embodiments, the vendor can use the same root of trust (402a, 402b, 402c, 402d) as DeftT (as shown), though this is not required provided that the (402a, 402b, 402c, 402d) for the vendor is published to the other entities over DeftT (this complexity is omitted here for clarity). The vendor then has the vendor's public key signed by the Certificate Authority (CA) with the root key through a Certificate Request (CSR) process, yielding the Vendor Certificate.

At step 420, through a secure process such as DeftT, a VPN, or TLS link the vendor sends new software container binaries, vendor certificates, and software version lists to the TCMS Administrator. The Administrator has the highest level of security (the tower in the castle) with physical controls on the server, tight password protection, etc. As shown in an example embodiment, in the Administrator system are: a version control list, a library of container binaries, and a library of vendor certificates. The deployment console is used to specify preferred versions of each software container binary, time of day to perform the upgrade, etc. Also, the deployment console generates container trust rule permissions specifying which container can get which software binaries, which containers can execute which commands, and any other permissions constraints. There exists an Administrator supervisor component that collects any flags from the processes internal to the Administrator (including a parser/validator at each side of each publishing interface, such as exiting the Administrator into the TEE). The Administrator supervisor also subscribes to publications from the secure supervisor in the TEE and the supervisor in the REE. The container manager working together with the Administrator supervisor determines if any containers in the TEE need to be replaced. (In analogy to the castle, if the tower guard sees too many visitors with unstamped, expired, or invalid passports they may throw the courtyard guards in the dungeon and replace them since they should have blocked those visitors). This demonstrates the hierarchal architecture of the TCMS, but TEE container replacement is not shown in detail in FIG. 4.

At step 430, the signed vendor software binaries, the version control list, and the vendor certificates are all named with hierarchical DeftT named data names and assembled into DeftT publications.

At step 440, the trust rules as well as the other publications are signed with the highest security level root private key in the TCMS that is in the Administrator TPM (or, in some embodiments, HSM for a comparatively higher level of security).

At step 450, the publications are published by the Administrator, and applications in the TEE, such as the container manager, subscribe. In exiting the Administrator server over the TCP/IP connection, the publications are first parsed/validated and the trust rules checked; and then again in Edge Controller 1 as they enter the TEE.

At step 460, the individual binaries for the Container 1 contents are assembled into a container with a process such as Docker. This container includes a public/private key pair that is generated in the TEE for this specific Container 1 instance. This public key is then signed by the TEE TPM private key to generate the Container 1 certificate. This key pair is then loaded into the container. Alternatively, a key pair generation binary in a hierarchical container could be added to Container 1 and used to generate these keys dynamically, in addition to the included static key pair for bootstrapping.

At step 470, the secure supervisor subscribes to publications from the supervisor in the REE of Edge Controller 1 as well as any flags from the parser/validator in the REE. This is communicated with the container manager.

At step 480, the container manager subscribes to the version control list. When an updated version of the Container 1 contents is needed or supervisor flags unexpected content from the parsers, the container publication is triggered.

At step 490, the TEE container manager publishes the assembled container binary. The publication is delivered into Container 1.

At step 4100, after it is loaded, Container 1 begins execution. It validates its certificates back to the root of trust and validates the container binary with the vendor certificate and the root of trust. Trust rules are used to validate that this container is authorized to run the binaries in the container. Container 1 is now assured that it is correctly running the validated signed software binary, that it is authorized by the trust rule to do so, and that its DeftT certificate chain is correct and validated.

At step 4110, Container 1 publishes its certificate back to the TEE and to other containers including Container 2, in this example. The certificate can be used to validate any publications that Container 1 will later make. With the certificates distributed to all containers, inter-container communications can be made with a secure DeftT protocol, with zero-trust trust rules and parser/validators that constrain the communications to more narrowly defined constructs. This reduces the inter-process attack surface.

Example Messaging Architecture and Operations

Figure 5:
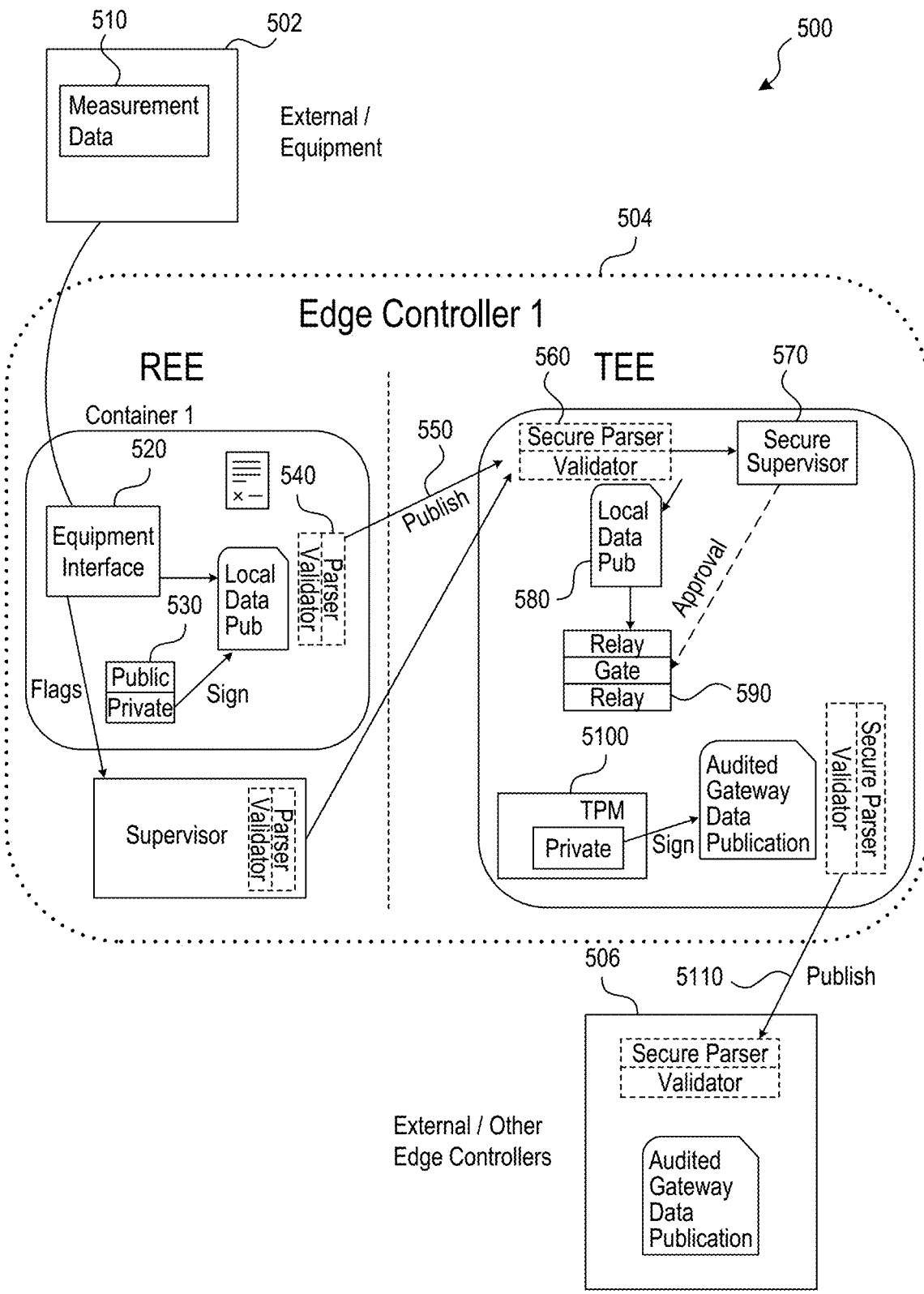
FIG. 5 shows an example infrastructure that enables secure data flow in a TCMS, according to some embodiments.

FIG. 5 shows an example infrastructure 500 including one or more controllers (504, 5060 that enable secure data flow in a TCMS, according to some embodiments. In the example below, described in reference to FIG. 5, data publication in the TCMS is demonstrated. For illustrative purposes, assume that a properly deployed DeftT Container 1 in Edge Controller 1 has requested a data reading from OT remote site equipment. The security aspects and data flows of the data response are detailed below following the numbered steps in FIG. 5.

In the example scenario, at step 510, an external equipment measurement device 502, such as a solar inverter responds to a prior request with a power measurement over a SCADA protocol such as Modbus over TCP on a wired Ethernet cable to the REE hardware interface of Edge Controller 1 504.

At step 520, in Container 1, the equipment Interface application collects the measurement data and forms it into a publication. Any error flags from the conversion process are sent to the supervisor process outside the container optionally through secure DeftT pub/sub communication with trust rules that constrain the published content to valid flag syntax.

At step 530, the Modbus data response is wrapped in the DeftT publication (e.g., the data response is used to generate a payload of the DeftT publication), and the DeftT publication is then signed with the private key of a key pair. In some embodiments, the key pair is associated with Container 1. In some embodiments, the key pair corresponds to a certificate and/or role certificate that, for example, can contain the public key of the key pair. The DeftT publication can include a structured name which, for example, can be generated based on the Modbus data response and/or measurement data. The DeftT publication can additionally include an identifier that identifies a certificate or role certificate (e.g., the certificate containing the public key associated with the private key used to sign the DeftT publication). In some embodiments the DeftT publication is signed with a symmetric key instead of being signed with the private key.

At step 540, as part of the publication process, the local data publication is checked by the validator for trust rule authorization to access the particular inverter, that the certificates corresponding to the publication and for Container 1 are valid and not expired. The trust rule can be subscribed to, for example, using a signature identifier associated with the structured name of the DeftT publication and/or a role associated with the certificate identified by the DeftT publication, similarly to a guard checking authorization papers and passport on leaving the moat area for the secure courtyard. The parser checks the contents of the packet to confirm they are the prescribed valid SCADA data responses and match the corresponding DeftT publication name syntax in the header—e.g., that the payload of the DeftT publication is consistent with the structured name of the DeftT publication. For example, if the structured name of the DeftT publication indicates that the publication is associated with measurement data, the system can verify that the payload represents measurement data and not, for example, configuration or administrative data. Although the validator and parser in the REE (e.g., the untrusted validator and untrusted parser) are described as two software components, in some embodiments their functions can be combined (e.g., an untrusted validator/parser).

At step 550, the supervisor in the REE also publishes any flags or other data from overseeing the processes in Container 1. The secure supervisor in the TEE subscribes to these publications. Trust rules define that only the supervisor role can publish this publication and the parser checks the content data syntax, and finally certificate validity checks are performed. These checks may be performed both in exiting the REE (publishing) and entering the TEE (subscribing). Any discrepancies between flags recorded by the supervisor in the REE and the secure supervisor in the TEE are noted by the secure supervisor as a strong indicator that there is some corruption of Container 1 or the supervisor in the REE.

At step 560, the secure parser in the TEE makes sure that the actual data contents of each publication are consistent with its name (e.g., by performing a consistency check between the payload of the DeftT publication and the publication's structured name), and the DeftT trust rule validator ensures the named publication and signature including the role certificate has allowed permissions from the trust rule. The trust rule can be subscribed to, for example, using the structured name identifier of the corresponding DeftT publication. This ensures that malicious contents are not somehow substituted into the payload, although this would also impact the signature validation of the publication and should be flagged if corrupted. In addition, the publication, role certificate, and trust rule are validated through a trust chain of certificates back to the root (root of trust certificate) stored in each entity (not shown in FIG. 5). Advantageously, there is higher confidence in the TEE parser and validator since they operate in the secure TEE environment that makes it more difficult to compromise when compared with the processes in the REE. Although the validator and parser in the TEE (e.g., the secure validator and secure parser) are described as two software components, in some embodiments their functions can be combined (e.g., a secure validator/parser as discussed in relation to FIG. 3).

At step 570, any detected issues in the validation or parsing produce flags which are communicated to the secure supervisor.

At step 580, the measurement data in the local data publication is passed through the initial certificate and signature validation and enters the relay.

At step 590, the relay transitions between the audited and unaudited parts of the TEE. The unaudited publications are those initially subscribed to from the REE. The secure supervisor analyzes the data collected from the REE supervisor, the TEE secure supervisor and the TEE parser/validator and other inputs and determines if there is rogue behavior indicative of a cyber breach or stalled processes (based, for example, on expected behavior in the prescribed/simplified OT protocols, past history, and/or any AI or machine learning processing), it can then block the publication with the gate if required. However, if the publication passes the relay gate, it is deemed to be "audited" and can be re-signed with the TEE private key in the TPM as an additional authentication step (e.g., to generate the audited publication). Instead of blocking a corrupted publication with the gate, the REE supervisor can alternatively revoke the Container 1 DeftT certificate, or if a whitelist of allowed containers is maintained by the REE supervisor then Container 1 can be removed from the list. Finally, trust rules could be modified to disable the infected Container 1, but these trust rules are typically only used for static system configuration.

At step 5100, publications that pass all of the validation steps in the TEE can be double signed with the TPM private key to create an audited gateway data publication. This step guards against data taking less secure rogue paths. In analogy to the castle, the courier with a poisoned letter crosses the moat in a distant corner of the castle grounds where a corrupt guard signs the letter and then he sneaks back into the field outside the moat. He then rides to the other side of the castle where there is a hidden tunnel that goes directly to the tower bypassing all the security. When the courier arrives at the guard outside the king's chambers and shows him the signed letter, the guard notes that the letter does not have the required special visa stamp. The visa is typically petitioned at the visa kiosk in the center of the doubly secured courtyard by providing a visa application together with a stamped passport and the letter, for analysis. Alarmed, the guard questions and then executes the courier, but without the visa requirement the king could have been poisoned. A valid visa is stamped with the secure TPM stamp pattern found only in the secure courtyard and cannot be forged.

At step 5110, the audited gateway publication is published externally optionally with different trust rules than the local data publication (which is optionally not authorized for external publication). The parsing/validation and trust rules are checked both on publication from the Edge Controller 1 secure external TCP port as well as upon subscription by, for example, a server. These operations guard against data corruption or substitution in transit.

Example Virtual TPM Architecture and Operations

Secure key storage in a TPM for use by containers in the REE is generally difficult to achieve. Hence, TPM key storage in the REE is generally unavailable. Fundamentally, if the sharing of a single TPM by the TEE and the REE were allowed, then corrupted REE processes could compromise the TPM that is also used by the TEE. In a simple example, a common TPM command is to reset and clear all stored keys. If the reset command were initiated by a compromised REE container process, then all TEE and REE cybersecurity operations would lack keys and freeze, and this would be a successful denial of service attack.

Figure 6:
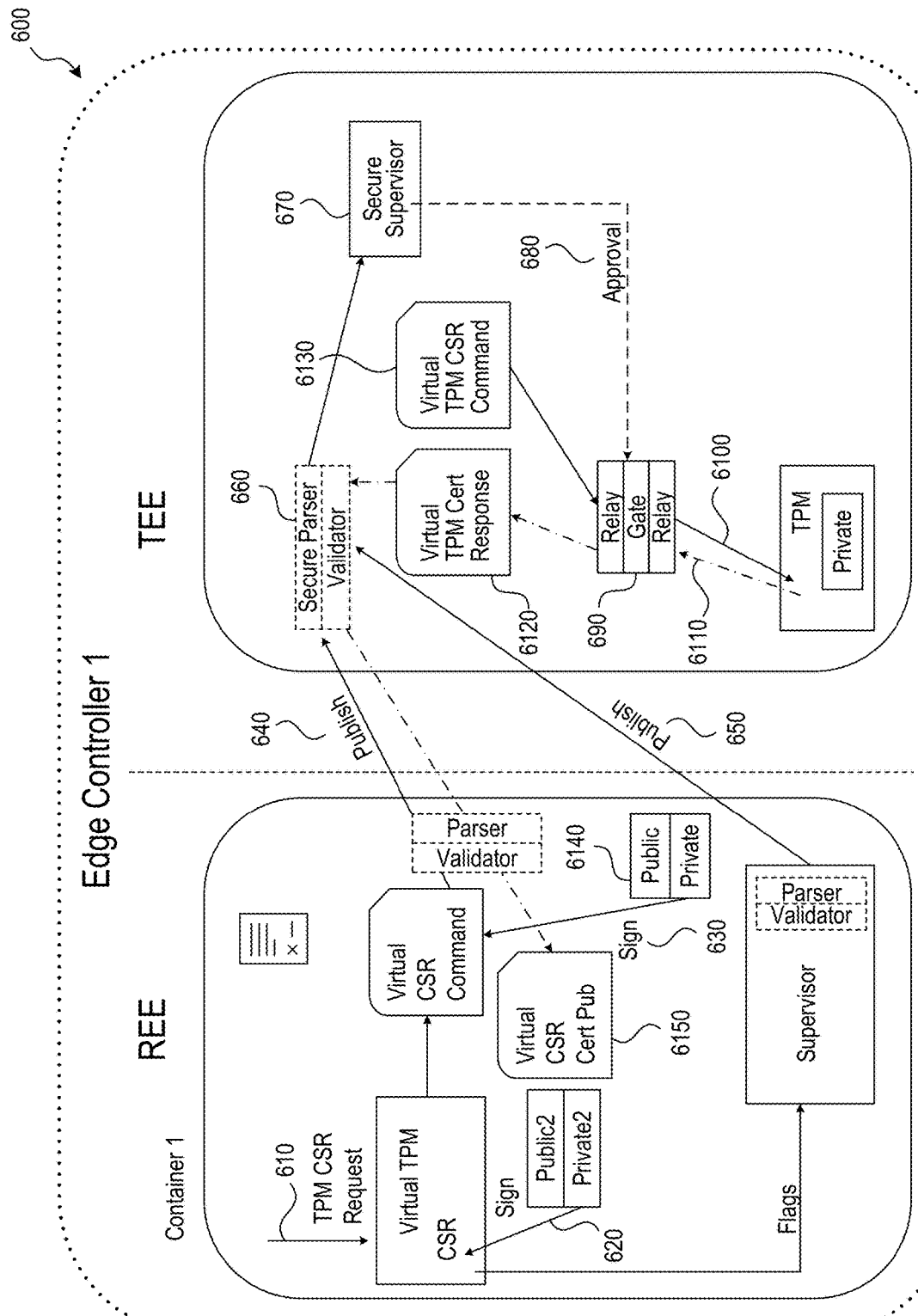
FIG. 6 shows an example messaging flow using a Trusted Process Module (TPM) in a TCMS, according to some embodiments.

FIG. 6 shows an example messaging flow 600 using a Trusted Process Module (TPM) in a TCMS, according to some embodiments. In FIG. 6, a TCMS Virtual TPM operation is described that provides both a way to securely access a TPM from the REE, as well as a way to further improve the security of the previous Data publication example, shown in FIG. 5.

Detailed steps below refer to the numbered elements in the example of FIG. 6.

At step 610, within Container 1 in the REE, assume that an application wants to access a private key securely stored in the TPM in the TEE of Controller 1. There is no direct operating system access, since this would compromise the TEE security boundaries. In this example, the required TPM access is represented by a CSR certificate signing request.

At step 620, a virtual TPM process in Container 1 creates a publication detailing the CSR TPM commands that need to be executed remotely in the TEE. As part of the CSR process, a new public2/private2 key pair is created in addition to the public/private key pair already present from the Container 1 deployment, as described in relation to FIG. 4. In this example, we recreate the Container 1 CSR certificate request process, for the new key pair public2/private2, and from the REE, that was previously performed in the TEE, producing public/private key pair that was preloaded into Container 1 as part of the deployment process discussed in relation to FIG. 4. To create the CSR in the Container 1 REE, the public2 key goes into the CSR and the private2 key of the key pair is used to sign the CSR.

At step 630, a DeftT CSR publication is created and contains a TPM CSR request. This publication is signed by the public/private key pair that was preloaded in the container as part of the deployment process of FIG. 4.

At step 640, the CSR publication is published by first validating/parsing and then checking against the allowed TPM operations for Container 1. For example, allowed TPM operations for Container 1 can include CSR and exclude TPM reset operations. The allowed TPM operations can be defined in the trust rule specified and signed by an Administrator deployment console (not shown). These validation checks can be performed first in the REE prior to publication to ensure that publication is allowed.

At step 650, the supervisor checks for and detects any flags from this Container 1 CSR process in the REE and publishes the report to the TEE. The operations can include performing the required parsing/validation and trust rule checking.

At step 660, in the secure TEE environment, the secure parser/validator rechecks the publication validity as in step 640, which can include certificate validation, parsed contents, and trust rule permissions. This can be performed after subscribing to the CSR and supervisor publications from the REE.

At step 670, the secure supervisor receives the validation data and flags/determines if the request is genuine and so that it will not compromise the TPM if executed. At step 680, the relay gate with zero-trust will pass on the TPM CSR publication if the permissions and validation are confirmed. At step 690, the relay unpacks the CSR request and routes it to the TPM. At step 6100, the TPM signs the CSR request with its stored private key. At step 6110, the completed CSR is returned to the relay, which creates a virtual TPM CSR response publication that is signed with the TPM private key. At step 6120, gate approval is still active from the secure supervisor, and the Virtual CSR publication passes into the secure validator/parser and trust rule checker. At step 6130, validation checks are completed to initiate the Virtual CSR publication. At step 6140, the subscribed Virtual CSR publication is again validated, parsed and rule checked in the REE. At step 6150, the new certificate for the public2/private2 key pair is complete. This key pair can be used for subsequent publications. The CSR was completed through a virtual process from the REE. The TPM in the TEE was not put at risk due to the defense-in-depth command, permissions, and authentication validation checking in the TCMS.

One potential issue with static public/private key distribution in the Container 1 deployment of FIG. 4 is that if the system can run for a long time period in the insecure REE with the private key in memory. Accordingly, there could exist a possibility that another container process that is corrupted might be able to access the key by moving laterally through the shared REE resources. If the Container 1 private key is discovered by another container, then the rogue container can have complete control over Container 1, though it could still be constrained by the trust rules that apply to the Container 1 role. Additionally, if the Edge Controller at a remote site can be physically compromised and the memory contents dumped, these operations would also enable unauthorized access to the private key. Accordingly, the embodiment of FIG. 6 provides an additional layer of security because a TPM private key cannot be removed from the secure hardware storage.

According to some embodiments, another mitigation to the above-described problem is to periodically regenerate the public/private key pairs for Container 1 and perform a virtual CSR to process to generate fresh certificates. Provided that Container 1 is bootstrapped with an initial public/private key pair as shown in FIG. 4, a new key pair can be generated and subsequently used as shown in the virtual CSR process in FIG. 5, yielding a second public2/private2 key pair and certificate. At a predetermined time period later, such as 4 hours, a new public3/private3 keypair can be created by using the same DeftT Virtual CSR process. In this case with the DeftT CSR publication can be signed by private2, a certificate can be generated, and so forth. The prior key pair public/private can then be obsoleted and removed from memory and the corresponding certificate expired or revoked. Thus, assuming an intruder, after some work, ultimately compromises some other container, for instance, Container 2 in Edge Controller 1, and then though lateral movement in the Edge Controller 1 REE memory space extracts the Container 1 private key from memory, the intruder's options would be limited. The extracted key would rapidly become obsolete, as the Container 1 public/private key pairs would rotate, and the obsolete private key's corresponding public key certificate that would be revoked.

Example Systems and Methods for Ensuring Resiliency

In addition to cybersecurity compromises in the REE impacting industrial infrastructure communications system reliability and security, it can be important to guard against system outages, where processes in a container can freeze up or fail without nefarious cybersecurity activity. Additionally or alternatively, a cyber-attack may occur that compromises a container so that it is disabled and ultimately needs to be replaced by content overwriting. Container redeployment takes time, and the remote infrastructure system communications could be unavailable during the interim. This is costly and could present a safety hazard in some critical infrastructure systems. Hence, it can be advantageous to provide resilient system operation in all cases.

Figure 7:
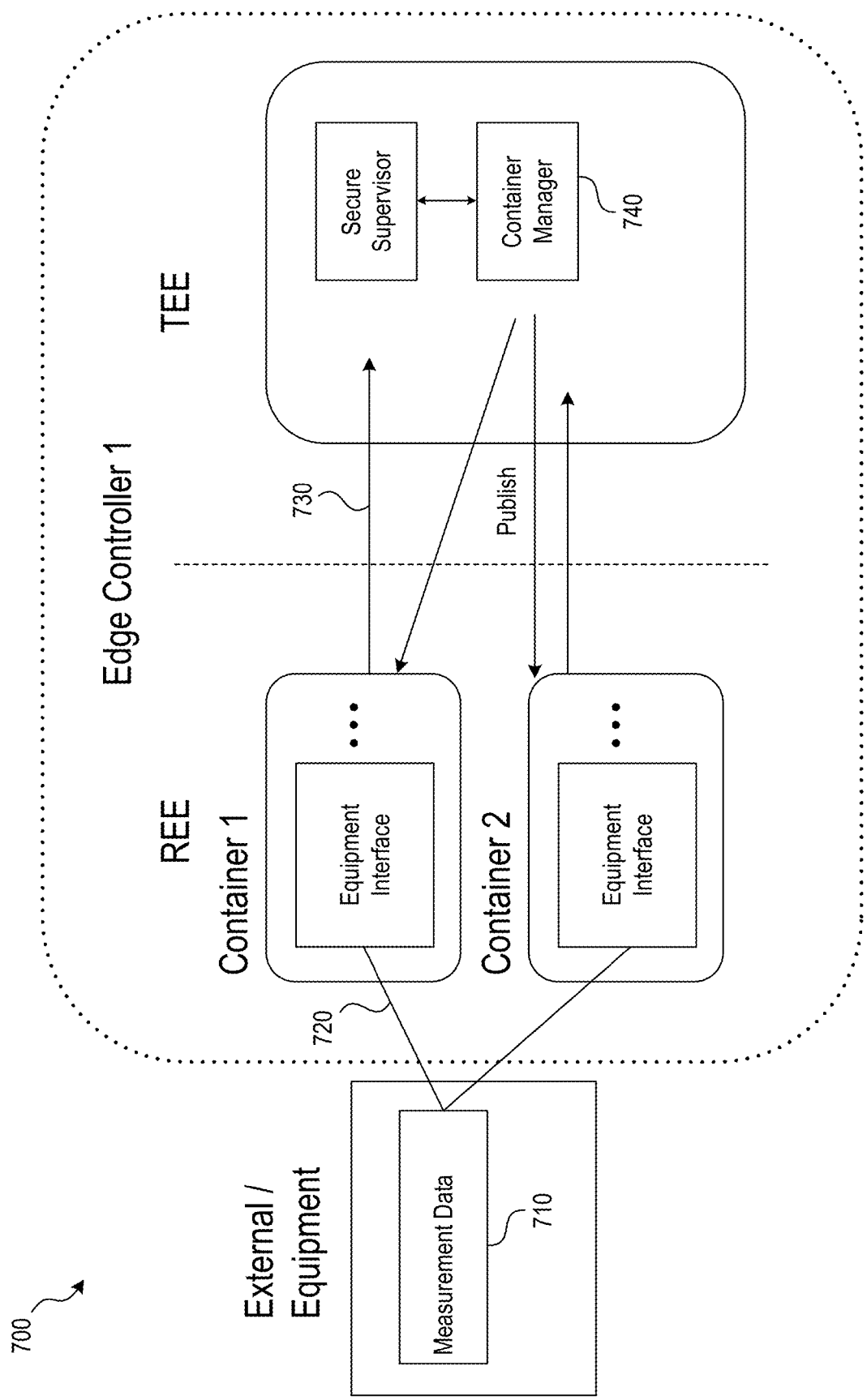
FIG. 7 shows an example messaging flow for maintaining parallel container resiliency in a TCMS, according to some embodiments.

According to various embodiments described herein, one advantage of DeftT pub/sub is that multicast publications can be sent to several parallel containers or edge controllers for resilient operation. FIG. 7 shows an example messaging flow 700 for maintaining parallel container resiliency in a TCMS, according to some embodiments.

The detailed steps in an example embodiment of FIG. 7 are described below.

At step 710, an external measurement device is connected to two physical ports on an Edge Controller—for example, via separate Ethernet cable connections or a single connection with separate IP addresses.

At step 720, the measurement data from the external measurement device is routed in parallel to the two containers: Container 1 and Container 2.

In relation to step 730, it is understood that ordinarily both Container 1 and Container 2 are active. A failover process can be used where one master container (here, Container 1) operates unless the secure supervisor, and container manager sees an outage or cyber compromise and triggers a container redeployment, which can include content overwriting. The failover process (here, to Container2) can be rapid or seamless with no lost data. The container redeployment can then be performed on the inactive parallel container (Container 1), which, in this example, restarts active status for resiliency once the redeployment is complete.

In relation to step 740, another use of the parallel containers can be to refresh the containers and public/private key pairs. This can be an alternative to or can supplement the virtual TPM approach with public/private key pair rotation and virtual CSR, as was described in FIG. 6. In this example, periodically, the TEE Connection Manager can create a new container with a fresh static public/private key pair and corresponding certificate, created through a CSR process performed fully in the TEE prior to building the container replacement, as was previously described for container deployment in relation to FIG. 4. The new container can then be published into the non-active parallel container using content overwriting. Once properly loaded, if a container failover process is initiated, then the failover can occur without an outage, enabling the new key pair. After failover, the now non-active container can be overwritten with yet newer keys. After a programmed delay a second periodic failover can be initiated, and so forth. Such parallel container overwriting would result in updated key pairs and certificates, as well as in restarting with a freshly validated signed software binary.

Figure 8:
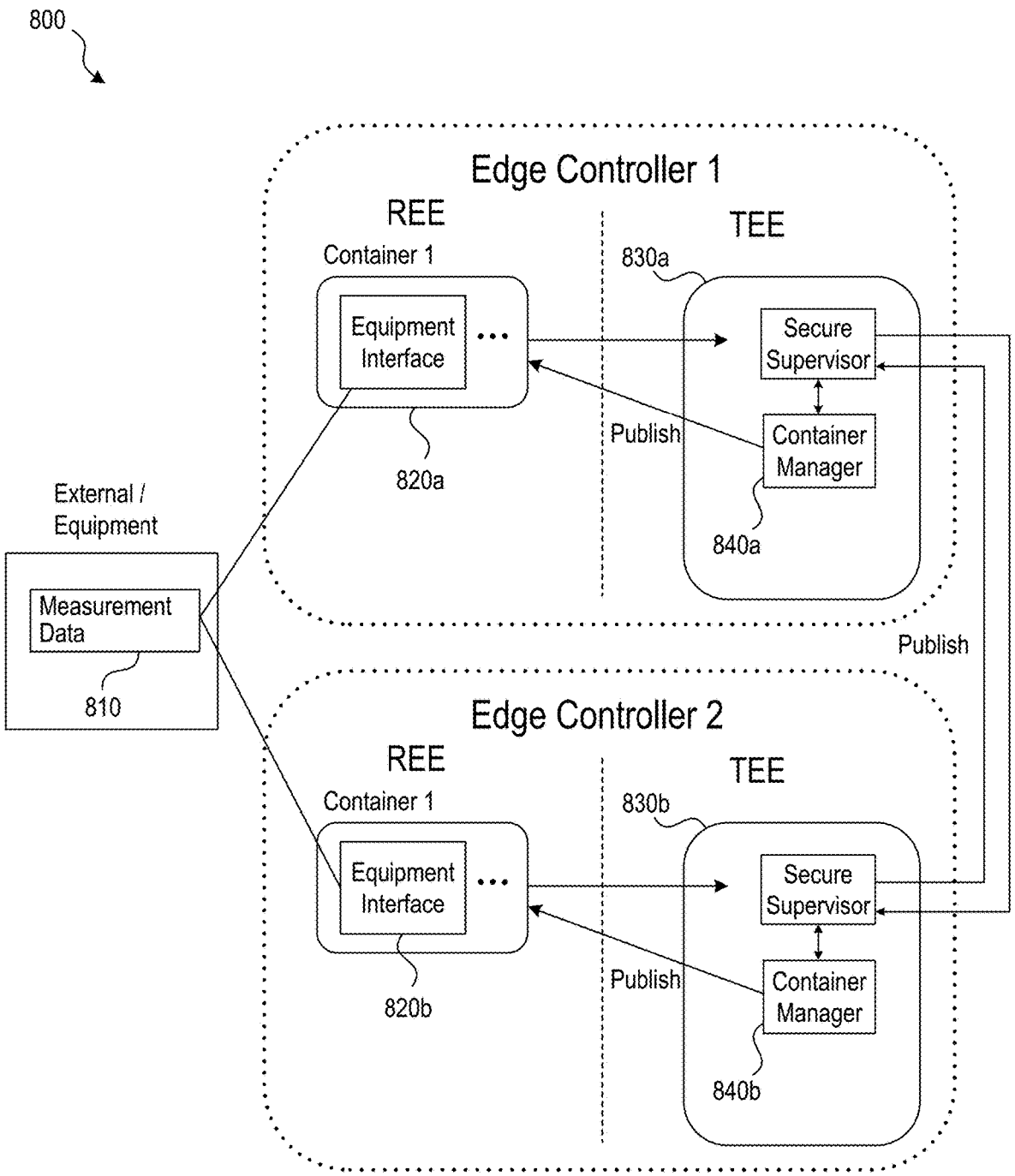
FIG. 8 shows an example messaging flow for maintaining parallel controller resiliency in a TCMS, according to some embodiments.

A second resiliency example is shown in FIG. 8 as an example messaging flow 800 for maintaining parallel controller resiliency in a TCMS, according to some embodiments. In this example, parallel Edge Controllers can be used in a similar way to the parallel containers of FIG. 7. The operations (e.g., operations 810, 820*a*, 820*b*, 830*a*, 830*b*, 840*a*, 840*b*) enable secure coordination between the Secure Supervisors in the separate Edge Controllers using DeftT pub/sub. Failover can be initiated in a similar way to the parallel container resiliency case described in relation to FIG. 7. The advantages of parallel container resiliency in FIG. 7 can be retained with parallel Edge Controller resiliency.

A technical benefit of using duplicate Edge Controllers is that any hardware malfunctions in the Edge Controllers (which, for example, may be presented with harsh environments at a remote industrial site) are mitigated. A failed Master Edge Controller can seamlessly fail over to the functioning Edge Controller. Then the failed Edge Controller hardware can be replaced without a TCMS communications outage. During normal operation, when both parallel Edge Controllers are simultaneously operational, Edge Controller 1 and Edge Controller 2 can perform periodic container redeployment with content overwriting with fresh containers including new static public/private keys and certificates. Periodic scheduled failover to the refreshed controller can update the TCMS private key similarly to the operations discussed in relation to the parallel container resiliency example of FIG. 7.

CONCLUSION

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," and/or any variant thereof, means any connection or coupling, either direct or indirect, between two or more elements; the coupling and/or connection between the elements can be physical, logical, and/or a combination thereof. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively.

The above detailed description of implementations of the system is not intended to be exhaustive or to limit the system to the precise form disclosed above. While specific implementations of, and examples for, the system are described above for illustrative purposes, various equivalent modifications are possible within the scope of the system, as those skilled in the relevant art will recognize. For example, some network elements are described herein as performing certain functions. Those functions could be performed by other elements in the same or differing networks, which could reduce the number of network elements. Alternatively, or additionally, network elements performing those functions could be replaced by two or more elements to perform portions of those functions. In addition, while processes, message/data flows, and/or blocks are presented in a given order, alternative implementations may perform routines having blocks, or employ systems having blocks, in a different order, and some processes or blocks may be deleted, moved, added, subdivided, combined, and/or modified to provide alternative or subcombinations. Each of these processes, message/data flows, and/or blocks may be implemented in a variety of different ways. Also, while processes and/or blocks are at times shown as being performed in series, these processes or blocks may instead be performed in parallel, and/or may be performed at different times. Further, any specific numbers noted herein are only examples: alternative implementations may employ differing values and/or ranges. Those skilled in the art will also appreciate that the actual implementation of a database may take a variety of forms, and the terms "database" and "library" are used herein in the generic sense to refer to any data structure that allows data to be stored and accessed, such as tables, linked lists, arrays, etc.

The teachings of the methods and systems provided herein can be applied to other systems, not necessarily the system described above. The elements, blocks and acts of the various implementations described above can be combined to provide further implementations.

Any patents and applications and other references noted above, including any that may be listed in accompanying filing papers, are incorporated herein by reference. To the extent any materials incorporated herein by reference conflict with the present disclosure, the present disclosure controls. Aspects of the technology can be modified, if necessary, to employ the systems, functions, and concepts of the various references described above to provide yet further implementations of the technology.

These and other changes can be made to the invention in light of the Detailed Description. While the above description describes certain implementations of the technology, and describes the best mode contemplated, no matter how detailed the above appears in text, the technology can be practiced in many ways. Details of the system may vary considerably in its implementation details, while still being encompassed by the technology disclosed herein. As noted above, particular terminology used when describing certain features or aspects of the technology should not be taken to imply that the terminology is being redefined herein to be restricted to any specific characteristics, features, or aspects of the technology with which that terminology is associated. In general, the terms used in the following claims should not be construed to limit the invention to the specific implementations disclosed in the specification, unless the above Detailed Description section explicitly defines such terms.

For example, a structured publication name signifies a hierarchical named data construct such as an ICN or NDN named data. A certificate can represent a DeftT publication containing a public key that is signed by a certificate authority and can be subscribed to using a condensed certificate identifier also known as a DeftT KeyLocator and/or a signature identifier.

Systems in accordance with several embodiments of the present technology have been described herein. Other embodiments of the present technology can include systems, system components, methods, and/or steps that differ from those expressly shown and/or described herein. Furthermore, references to "system" and/or "the system" may apply to systems having characteristics different than those expressly shown and/or described herein.

We claim:

1. A method, performed by a computing system, to enable secure management of a software container, the method comprising:
   executing, in a Rich Execution Environment (REE) of the computing system, an application, wherein the application is contained in a software container of the REE and wherein the application generates communication data associated with a destination external to the computing system;
   generating, at a Defined-Trust Transport (DeftT) shim contained in the software container, a DeftT Publication,
      wherein the DeftT Publication comprises a payload based on the communication data, a structured name, and a signature identifier, and
      wherein the signature identifier identifies a certificate comprising a public key and a role;

evaluating, at an untrusted validator contained in the software container, the DeftT publication according to a trust rule associated with the structured name and the role;

publishing, based on the evaluating by the untrusted validator, the DeftT publication;

subscribing, by a secure validator executing in a Trusted Execution Environment (TEE) of the computing system, to the DeftT publication;

evaluating, at the secure validator, the DeftT publication, comprising determining whether the payload of the DeftT publication is consistent with the structured name of the DeftT publication; and publishing, based on the evaluating by the secure validator, the DeftT publication to a communication channel external to the computing system.

2. The method of claim 1, wherein the evaluating the DeftT publication according to a trust rule comprises:

subscribing to the certificate identified by the signature identifier;

determining, based on the subscribing, the public key and the role of the certificate;

validating the DeftT publication based on the public key;

subscribing to the trust rule associated with the structured name and the role, wherein the trust rule relates to authorized capabilities of the role;

determining whether the DeftT publication is authorized to be published based on the trust rule; and evaluating whether the structured name is consistent with the payload of the DeftT publication.

3. The method of claim 1, wherein the DeftT shim in the software container generates the structured name of the DeftT publication based on a property of the communication data.

4. The method of claim 1, wherein the evaluating at the secure validator further comprises:

subscribing to the certificate identified by the signature identifier;

determining, based on the subscribing, the public key and the role of the certificate;

validating the DeftT publication based on the public key;

subscribing to a trust rule associated with the structured name and the role, wherein the trust rule relates to authorized capabilities of the role; and determining whether the DeftT publication is authorized to be published based on the trust rule.

5. The method of claim 1, the method further comprising:

generating, based on the evaluating by the secure validator, at a relay shim executing in the TEE, an Audited DeftT publication based on the DeftT publication, wherein the Audited DeftT publication is signed by a second private key contained in a Trusted Process Module (TPM) in the TEE of the computing system; and publishing the Audited DeftT publication, instead of the DeftT publication, to the communication channel external to the computing system.

6. The method of claim 5, wherein the second private key is stored in the software container.

7. The method of claim 1, the method further comprising:

evaluating, at a secure supervisor executing in the TEE, the DeftT publication and an evaluation by the secure validator, wherein the publishing of the DeftT publication to the communication channel external to the computing system is based further on the evaluation by the secure supervisor.

8. The method of claim 7, the method further comprising the secure supervisor gating the publishing of the DeftT publication to the communication channel external to the computing system.

9. The method of claim 7, the method further comprising overwriting the software container in the REE based on the evaluation by the secure supervisor.

10. The method of claim 7, wherein a particular evaluation by at least one of the untrusted validator and the secure validator further comprises:

validating the trust rule through a chain of certificates to a trust anchor certificate; and validating the DeftT publication through a chain of certificates to the trust anchor certificate.

11. The method of claim 1, wherein the DeftT publication is authenticated by a symmetric encryption key associated with a group, and wherein the group comprises entities associated with the computing system.

12. The method of claim 11, wherein the symmetric encryption key uses Authenticated Encryption with Associated Data (AEAD) encryption.

13. The method of claim 1, wherein the DeftT publication is signed by a private key.

14. The method of claim 1, wherein the payload of the DeftT publication is encrypted prior to publishing, and wherein the payload of the DeftT publication is decrypted upon subscription.

15. The method of claim 1, wherein the communication data is based on measurement data from an external measurement device, and wherein an evaluation by the untrusted validator comprises determining whether the software container is authorized to access the external measurement device.

16. The method of claim 1, the method further comprising generating, at a container manager executing in the TEE, a second software container.

17. The method of claim 1, further comprising generating a hash of the DeftT publication and storing the hash of the DeftT publication in a data store.

18. The method of claim 17, wherein the data store is an immutable ledger.

19. A computing system structured to enable secure management of a software container, the computing system comprising a memory, at least one hardware processor, and computer-executable instructions stored in the memory that, when executed by the at least one hardware processor, perform operations comprising:

executing, in a Rich Execution Environment (REE) of the computing system, an application, wherein the application is contained in a software container of the REE and wherein the application generates communication data associated with a destination external to the computing system;

generating, at a Defined-Trust Transport (DeftT) shim contained in the software container, a DeftT publication, wherein the DeftT publication comprises a payload based on the communication data, a structured name, and a signature identifier, and wherein the signature identifier identifies a certificate comprising a public key and a role;

evaluating, at an untrusted validator contained in the software container, the DeftT publication according to a trust rule associated with the structured name and the role;

publishing, based on the evaluating by the untrusted validator, the DeftT publication;

subscribing, by a secure validator executing in a Trusted Execution Environment (TEE) of the computing system, to the DeftT publication;

evaluating, at the secure validator, the DeftT publication, comprising determining whether the payload of the DeftT publication is consistent with the structured name of the DeftT publication; and publishing, based on the evaluation by the secure validator, the DeftT publication to a communication channel external to the computing system.

20. The computing system of claim 19, wherein the operations to evaluate the DeftT publication according to a trust rule further include:

subscribing to the certificate identified by the signature identifier;

determining, based on the subscribing, the public key and the role of the certificate;

validating the DeftT publication based on the public key;

subscribing to the trust rule associated with the structured name and the role, wherein the trust rule relates to authorized capabilities of the role;

determining whether the DeftT publication is authorized to be published based on the trust rule; and evaluating whether the structured name is consistent with the payload of the DeftT publication.

* * * * *